United States Patent
Byun et al.

(10) Patent No.: US 11,250,386 B2
(45) Date of Patent: Feb. 15, 2022

(54) OPTIMIZED SCHEDULING OF CALENDAR EVENTS

(71) Applicant: Microsoft Technology Licensing, LLC, Redmond, WA (US)

(72) Inventors: Byungki Byun, Issaquah, WA (US); Chenlei Guo, Redmond, WA (US); Divya Jetley, Kirkland, WA (US); Pavel Metrikov, Moscow (RU); Ye-yi Wang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 254 days.

(21) Appl. No.: 15/837,751

(22) Filed: Dec. 11, 2017

(65) Prior Publication Data

US 2019/0180248 A1 Jun. 13, 2019

(51) Int. Cl.
*G06Q 10/10* (2012.01)
(52) U.S. Cl.
CPC .............................. *G06Q 10/1095* (2013.01)
(58) Field of Classification Search
CPC ................................................. G06G 10/1095
USPC ...................................................... 705/7.19
See application file for complete search history.

(56) References Cited

U.S. PATENT DOCUMENTS

| | | | |
|---|---|---|---|
| 7,703,048 B2* | 4/2010 | Alford, Jr | G06Q 10/109 715/747 |
| 8,892,741 B2* | 11/2014 | Lipari | G06Q 10/1091 705/5 |
| 10,467,599 B1* | 11/2019 | Gardner | G06F 17/211 |
| 10,510,050 B2* | 12/2019 | Meushar | G06Q 10/1095 |
| 2003/0149606 A1* | 8/2003 | Cragun | G06Q 10/109 705/7.19 |
| 2013/0073329 A1* | 3/2013 | Shoham | G06Q 10/10 705/7.18 |

(Continued)

OTHER PUBLICATIONS

"International Search Report and Written Opinion Issued in PCT Application No. PCT/US18/063707", dated Feb. 20, 2019, 11 Pages.

(Continued)

*Primary Examiner* — Folashade Anderson
(74) *Attorney, Agent, or Firm* — Shook, Hardy & Bacon L.L.P.

(57) ABSTRACT

Systems and methods are disclosed to provide optimized scheduling of calendar events based on flexibility scores of calendar events. A flexibility score may be representative of a probability or likelihood that a calendar event can or will be rescheduled in response to a conflicting calendar event. Flexibility scores of calendar events may be calculated based on one or more factors, which may be weighted, using one or more machine-learning models. Factors may include: event densities of invitees' calendars, organizational rankings of respective invitees, the remaining time before an event start time, an urgency of respective calendar events, etc. In this way, if open time slots are not available for all invitees to a proposed calendar request, an event organizer may identify time slots occupied by existing calendar events with the highest likelihood of being rescheduled in view of the proposed calendar event, thereby facilitating scheduling of the proposed calendar event.

20 Claims, 14 Drawing Sheets

(56) References Cited

U.S. PATENT DOCUMENTS

| | | | |
|---|---|---|---|
| 2015/0356516 A1* | 12/2015 | Kagan | G06Q 10/1095 |
| | | | 705/7.19 |
| 2016/0350720 A1* | 12/2016 | Moorjani | G06Q 10/1095 |
| 2017/0091715 A1* | 3/2017 | Abou Mahmoud | |
| | | | G06Q 10/1095 |
| 2017/0178080 A1* | 6/2017 | Abebe | G06N 20/00 |
| 2018/0060826 A1* | 3/2018 | Stratvert | G06Q 10/1095 |
| 2019/0043018 A1* | 2/2019 | Hailpern | G06Q 10/063114 |
| 2019/0180248 A1* | 6/2019 | Byun | G06Q 10/1095 |

OTHER PUBLICATIONS

"Office Action Issued in European Patent Application No. 18836941.7", dated Jun. 7, 2021, 5 Pages.

\* cited by examiner

OPTIMIZED SCHEDULING OF CALENDAR EVENTS

BACKGROUND

Use of electronic calendars has become common for both professional and private use because of the near-ubiquitous use of mobile devices and the availability of mobile calendaring applications, which enable scheduling of events with colleagues and friends from virtually anywhere at any time. Shared calendars may store information regarding individual profiles of people, scheduled events, meeting facilities, etc. Scheduling calendar events among multiple participants, however, may become complicated with a large number of invitees or where available overlapping time slots are limited.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by optimized scheduling of a calendar event by evaluating each invitee's flexibility regarding existing calendar events. For instance, the shared calendar may automatically generate and update flexibility scores of each respective invitee's existing calendar events. Flexibility scores for existing calendar events may indicate a likelihood that an existing calendar event may be rescheduled in view of a proposed calendar event based on various criteria. Such criteria may include, for instance, evaluating a time difference between the current time and the proposed calendar event start time, a level of urgency between the existing calendar event and the proposed calendar event, a level of importance of invitees between the existing calendar event and the proposed calendar event, a level of importance for a particular location between the existing calendar event and the proposed calendar event, a level of invitee interest between the existing calendar event and the proposed calendar event, time preferences of the invitees, etc. Calendar events with higher flexibility for rescheduling may enable greater flexibility in scheduling proposed calendar events based on more choices of dates and times. Use of flexibility scores for scheduling and rescheduling calendar events may drastically improve and optimize the ease of scheduling calendar events for multiple invitees.

As collaborators' daily schedules may change at any time, flexibility scores of calendar events may be updated substantially continuously, on a set periodic basis, whenever calendar changes occur, or otherwise. Based on the complexity of criteria evaluated for calendar events, as well as ever-changing daily schedules of invitees, generating flexibility scores may be computing intensive and complex. As such, the present disclosure may use machine learning models to accumulate knowledge for providing weighted scores based on multiple parameters and conditions of the proposed and existing calendar events.

In an aspect, a computer-implemented method for scheduling a calendar event is provided. The method includes receiving a set of conditions for a proposed calendar event, where the set of conditions includes a desired time period and at least a first invitee. The method further includes retrieving a first calendar of the first invitee, where the first calendar includes at least a first existing calendar event that is scheduled during a first time period in temporal proximity to the desired time period. Additionally, the method includes determining that an open time period is not available on the first calendar of the first invitee during the desired time period and retrieving a first flexibility score for the first existing calendar event. Based on the first flexibility score, the method includes determining a proposed time period during the desired time period for the proposed calendar event, where the proposed time period overlaps at least in part with the first time period of the first existing calendar event, and sending an event request to the first invitee for the proposed calendar event during the proposed time period.

In another aspect, a computer system is provided. The computer system includes at least one processing unit and at least one memory storing computer-executable instruction that, when executed by the at least one processing unit, cause the computer system to receive a set of conditions for a proposed calendar event, where the set of conditions includes a desired time period and at least a first invitee. The computer-executable instructions further cause the computer to retrieve a calendar of the first invitee, where the calendar includes at least a first existing calendar event and a second existing calendar event, where the first existing calendar event is scheduled during a first time period in temporal proximity to the desired time period and where the second existing calendar event is scheduled during a second time period in temporal proximity to the desired time period. The computer-executable instructions also cause the computer to determine that an open time period is not available on the calendar of the first invitee during the desired time period and retrieve a first flexibility score for the first existing calendar event and a second flexibility score for the second existing calendar event, where the second flexibility score is higher than the first flexibility score. Based on a comparison of the first flexibility score and the second flexibility score, the computer further determines a proposed time period during the desired time period for the proposed calendar event, where the proposed time period overlaps at least in part with the second time period of the second existing calendar event, and sends an event request to the first invitee for the proposed calendar event during the proposed time period.

In yet another aspect, a computer storage medium is provided. The computer storage medium storing computer-executable instruction that, when executed by at least one processing unit, cause the at least one processing unit to receive a set of conditions for a proposed calendar event, where the set of conditions includes a desired time period and at least a first invitee, and retrieve a calendar of the first invitee, wherein the calendar includes at least a first existing calendar event and a second existing calendar event, wherein the first existing calendar event is scheduled during a first time period in temporal proximity to the desired time period, and wherein the second existing calendar event is scheduled during a second time period in temporal proximity to the desired time period. The computer-executable instructions further causing the processing unit to determine that an open time period is not available on the calendar of the first invitee during the desired time period and retrieve a first flexibility score for the first existing calendar event and a second flexibility score for the second existing calendar event, where the second flexibility score is higher than the first flexibility score. Based on a comparison of the first flexibility score and the second flexibility score, the computer-executable instructions also causing the processing unit to determine a proposed time period during the desired time period for the proposed calendar event, where the proposed time period overlaps at least in part with the second time period of the second existing calendar event, and send a meeting request to the first invitee for the proposed calendar event during the proposed time period.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
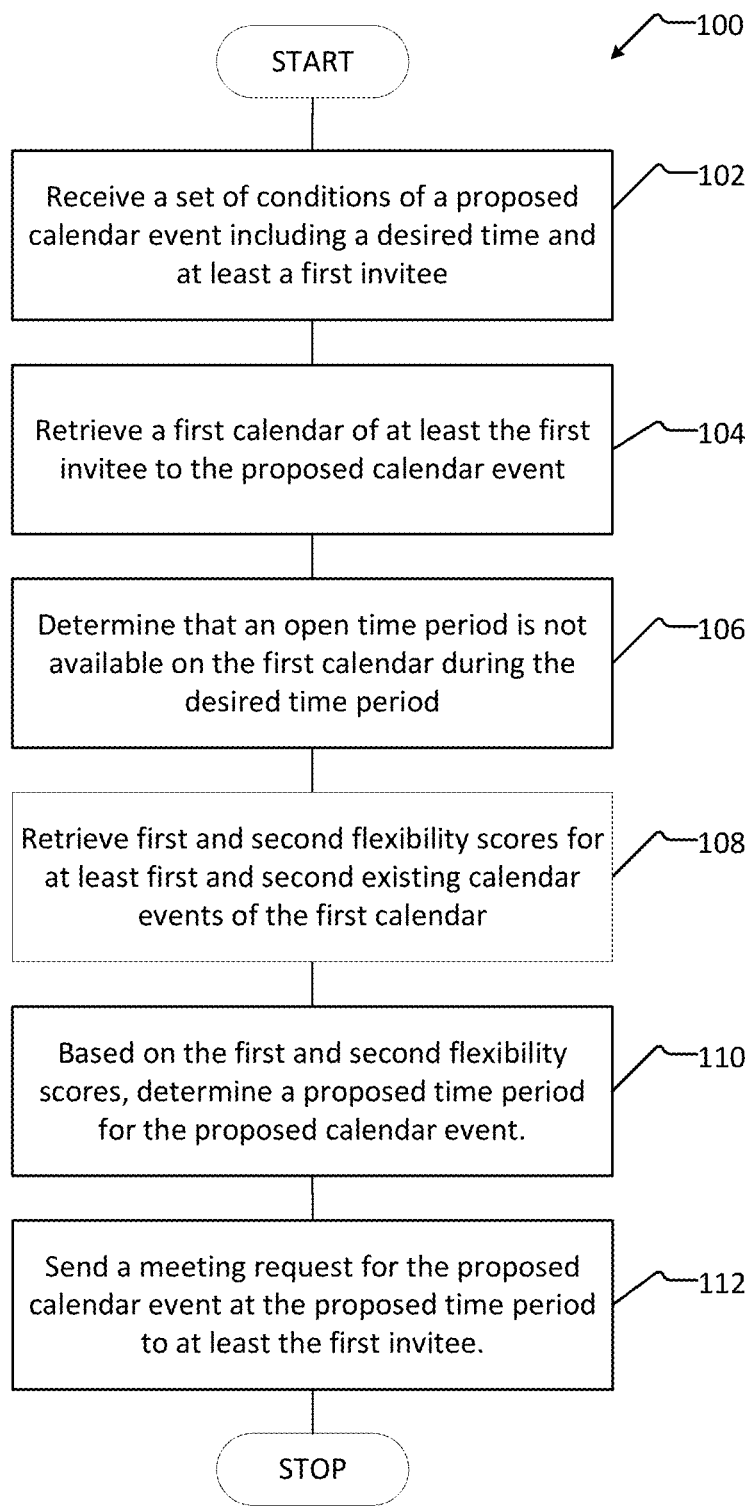
FIG. 1 illustrates an overview of an example system for scheduling a proposed calendar event based on flexibility scores of existing calendar events.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for optimized scheduling of calendar events based on calculating flexibility scores for calendar events. As sharing of calendars has become common place, work colleagues as well as private friends and family may have access to an invitee's pending calendar when scheduling a proposed calendar event. To schedule the proposed calendar event, the event organizer may review available dates and times of the invitees in order to schedule the proposed calendar event. However, scheduling conflicts among the invitees, particularly multiple invitees and/or very busy invitees, may make it difficult to find a mutually agreeable time. In this regard, present disclosure may generate and provide flexibility scores for each invitees' existing calendar events such that more flexible existing calendar events may be identified. A flexibility score may reflect a probability that the calendar event can or will be rescheduled in response to a conflicting calendar event. In this way, if open time slots are not available for all invitees to a proposed calendar request, an event organizer may identify time slots occupied by existing calendar events with the highest likelihood of being rescheduled in view of the proposed calendar event. Thus, scheduling a proposed calendar event at a mutually agreeable time is facilitated.

Scheduling a calendar event may involve a variety of constraints. Such constraints may include the organizational ranking of invitees. For instance, availability of high-ranked officers of a company may be less flexible than other levels of organizational employees. In addition, participation by such high-ranking invitees may be essential to a proposed calendar event. Moreover, facility requirements for a proposed calendar event may be among the constraints. For example, a calendar event may need to be held at a particular facility based on capacity, seating layout, availability of a projector or other equipment, etc.

Conventionally, when scheduling a calendar event, an event organizer would need to collect the constraints and conditions for the calendar event. Many times, the organizer would need to schedule and reschedule the calendar event in order to satisfy the constraints and/or conditions, as well as the availability of invitees. Such event scheduling may be manually-intensive, time-consuming, and often highly complex, especially as the number of invitees increases.

Some current implementations of calendar applications may indicate an availability status of proposed invitees. For example, some calendar applications may identify an availability status for various time periods of an invitee, such as, "free," "busy," "tentatively scheduled," "out of office," and the like. Such information, however, may be insufficient for an event organizer to schedule a calendar event when proposed invitees do not have any overlapping available time slots, when a particular required invitee is identified as "busy" for all overlapping available time slots of the other invitees, and the like. In this case, scheduling of the proposed calendar event may involve rescheduling other calendar events, and may often be beyond the event organizer's ability and/or control. The event organizer may be required to spend additional time contacting and coordinating with individual invitees with conflicting schedules or with event organizers of conflicting calendar events. There may be many factors (or parameters) that influence scheduling and rescheduling of calendar events. Additionally, some factors and/or parameters may need to be weighted more than others in determining which calendar events have priority, especially with continually varying schedules, differing organizational ranks, and various time and subject matter preferences of invitees.

Aspects of the present disclosure address these issues by scheduling and managing calendar events based on the relative flexibility levels of calendar events to accommodate scheduling or rescheduling. Flexibility of rescheduling a calendar event may be expressed in terms of a probability or likelihood that the calendar event can or will be rescheduled in response to a conflicting calendar event. A higher flexibility score may indicate a higher probability that the calendar event will be rescheduled to a different date and/or time in response to a conflicting calendar event. Many factors and/or parameters may be used to collectively determine a flexibility score of one calendar event vis-à-vis other calendar events, such that flexibility scores may be effectively used to represent how likely various calendar events are to be rescheduled, if necessary. In this way, when an event organizer is attempting to schedule a proposed calendar event, the flexibility scores for existing calendar events of invitees may be conveyed (e.g., by different shades of color, different fill patterns, etc.) such that the event organizer may identify existing calendar events that are more likely to be rescheduled than others. In contrast, rather than providing visual indications regarding the flexibility scores of various calendar events, the system may evaluate the flexibility scores of calendar events in the background and may suggest candidate time slots for a proposed calendar event based on conditions set forth by the event organizer.

In aspects, a flexibility score for a calendar event may be generated based on a variety of factors, parameters, conditions, etc. (collectively, "factors") that may affect scheduling of the calendar event. For example, a level of "busyness" of the event organizers (for existing or proposed calendar events) and the invitees (e.g., for existing or proposed calendar events) may influence the flexibility of existing calendar events associated with the event organizers and invitees, respectively. For example, while a proposed invitee associated with an existing calendar event may not be terribly busy (e.g., increasing the flexibility score for the existing calendar event), the event organizer for the existing calendar event may be quite busy (e.g., decreasing the flexibility score for the existing calendar event). The busyness of other invitees (e.g., high-ranking employees) to the existing calendar event may also be taken into consideration. Thus, the relative flexibility score for an existing calendar event may take into consideration the busyness of multiple individuals, which in some cases may have contrary implications.

To generate a flexibility score that takes into consideration the busyness of multiple event organizers and/or invitees for an existing calendar event, calendars of the event organizers and/or invitees may be evaluated within a proximity to a desired time period of a proposed calendar event. To assess a busyness of an individual, the number and quality of alternative available time slots in proximity to the desired time slot may be assessed. A time slot may be associated with any suitable temporal increment (e.g., quarter hour, half hour, full hour, etc.), and a quality of the time slot may be assessed based on various parameters, e.g., invitee preferences (e.g., an invitee may prefer not to meet over lunch, reducing the quality of noon time slot for that invitee), appropriateness of the time slot for the calendar event (e.g., a late afternoon time slot may be appropriate for a happy hour calendar event, increasing the quality of such a late afternoon time slot for such a calendar event), or based on any other parameter. A level or degree of busyness may be reflected by a number of calendar events (e.g., calendar density) scheduled within a given time period. Some aspects of the present disclosure may measure the calendar density of invitees as a measure of busyness. In some cases, the higher the calendar density is, the higher the busyness of the individual, and the less flexible the calendar event associated with that invitee or event organizer.

In some aspects, a flexibility score may be determined based on a factor representing a time difference between the start time of the existing calendar event and the current time. In this case, the factor relates to a remaining time before the calendar event is to take place. As the current time approaches the start time of the calendar event, rescheduling the calendar event becomes more difficult and complex. For example, some invitees for such calendar event may have already made investments in preparation and travel plans in anticipation of joining the calendar event. Thus, a flexibility score of a calendar event may decrease as the remaining time before the start time of the calendar event decreases.

In some aspects, an urgency of a calendar event may be among the factors evaluated in generating a flexibility score of the calendar event. Urgency may be indicated based on a time constraint in scheduling the calendar event. Some calendar events may need to be scheduled before a certain deadline. For instance, a finance group may have to have a series of corporate finance meetings in preparation for tax filings and may hold its final status meeting in proximity to the tax deadline. In some aspects, such a status meeting may have a high level of urgency. As the level of urgency increases, the probability that the calendar event will be rescheduled to accommodate a proposed calendar event decreases and, thus, the flexibility score also decreases.

In some aspects, the respective importance levels among the invitees of a calendar event may vary, as well as the respective importance levels among invitees of different calendar events. In this case, the presence of a high-level invitee among invitees to the calendar event may affect a flexibility score for the calendar event. That is, a calendar event in which the Chief Executive Officer (CEO) of a corporation is an invitee may have a lower flexibility score than a calendar event associated with less prominent invitees. That is, a calendar event in which the CEO is an invitee may have a lower probability of being rescheduled than another calendar event.

In some aspects, a factor used to generate flexibility scores may represent a level of location or facility requirements for a calendar event. A level of location or facility requirements may be determined or estimated based on evaluating the calendar events, such as, but not limited to: evaluating capacity requirements based on a number of in-person invitees; equipment requirements including overhead projectors, audio, and telecommunication systems; seating arrangement requirements such as theater-style seating or round-table seating; geographic location requirements based on in-person invitees; and the like. As different locations or facilities may be equipped differently, some calendar events may have a higher need for a particular location or facility than other calendar events.

In some aspects, a factor used to generate flexibility scores may represent interest levels of invitees regarding a calendar event. An interest level of an invitee may be determined or estimated based on evaluating preferences of an invitee, previous calendar events attended by the invitee, previous calendar events rescheduled or cancelled by the invitee, and the like. Additionally or alternatively, interest levels of invitees may be determined based on evaluating contents of emails related to a calendar event exchanged by invitees. For example, it may be determined that an invitee is less interested in a particular calendar event than other calendar events. In this case, the particular calendar event may have a higher flexibility score to the invitee, i.e., the invitee may be more likely to reschedule the calendar event in view of a conflicting calendar event. Alternatively, it may be determined that an invitee is more interested in a particular calendar event than other calendar events. In this situation, the particular calendar event may have a lower flexibility score to the invitee, i.e., the invitee may be less likely to reschedule the calendar event in view of a conflicting calendar event.

In some aspects, a factor used to generate flexibility scores may represent invitees' time preference regarding a calendar event. In some aspects, different invitees may have different time preference patterns for calendar events. For instance, some invitees may prefer to have strategic meetings during morning hours, while other invitees may prefer to keep a certain time period (e.g., between 11 am and 1 pm) open to accommodate personal lunch appointments. Some invitees may decline scheduling work-related calendar events after 5 pm, while other invitees may prefer to schedule longer meetings on weekends or may prefer to insert a ten-minute break between meetings. Still other invitees may prefer to keep a calendar density below some threshold value, e.g., a calendar density at or below 90% during work hours, such that 10% of time may be available as floating time or break. Such time preferences may affect a complexity of identifying commonly available time slots among invitees of a proposed calendar event.

In some aspects, generating a flexibility score for a calendar event may be based a plurality of factors, e.g., the factors described above or other factors. For instance, other factors may include whether an existing calendar event has been accepted to a calendar or not (i.e., a tentative calendar event). If an existing calendar event is tentative, it may have a higher flexibility score (i.e., there may be a higher probability that the existing calendar event will be rescheduled and/or not accepted in response to a conflicting calendar event). In further aspects, flexibility scores may be determined based on weighting certain factors more than others. For instance, a factor representing a high level of importance for an invitee or a high level of urgency may be weighted more than a factor representing an invitee's time preference. For example, even a CEO's schedule may have to be adjusted to accommodate scheduling a meeting that is critically important for the corporation and has strict time limitations. The balance of weighting among the factors may dynamically change based on, for example, times of the year, changing invitee preferences, changing invitee interests, changing levels of invitee importance, etc. With calendars continually changing among the invitees and the weighting of factors dynamically updating based on changing conditions, generating flexibility scores for calendar events may be highly processing intensive to be responsive to changing needs.

To reduce processing requirements, aspects of the present disclosure may generate flexibility scores of calendar events based on one or more machine learning models. Use of machine learning models may increase a speed and/or efficiency of generating a flexibility score for a calendar event by generating interim scores based on complex weighted processing using multiple factors, and then aggregating the interim scores to generate a model flexibility score.

Additionally, the system may dynamically update a model flexibility score for a calendar event. For example, model flexibility scores may be updated at any periodic interval, in response to a request to schedule a new calendar event, or otherwise. For instance, model flexibility scores may be updated periodically using background processing (or agent processing), upon receiving an update command, upon detecting a change in conditions, or substantially continuously in real-time.

FIG. 1 illustrates an overview of an example system for scheduling a proposed calendar event based on flexibility scores of existing calendar events. Method 100 determines at least one proposed time period (e.g., a suggested date and time) during a desired time period for a proposed calendar event based on one or more flexibility scores of existing calendar events in at least one calendar of an invitee to the proposed calendar event.

At receive operation 102, a set of conditions for a proposed calendar event may be received. Such a set of conditions may include at least a desired time period and at least one invitee for the proposed calendar event. The set of conditions may further include at least a second invitee to the proposed calendar event, a level of importance of the proposed calendar event, a proposed location of the proposed calendar event, a facility requirement for the proposed calendar event, equipment requirement for the proposed calendar event, and any other conditions that may influence scheduling of the proposed calendar event. In some aspects, such a set of conditions may be received from an event organizer via input devices of a computer system.

At retrieve operation 104, a first calendar of at least the first invitee to the proposed calendar event may be retrieved. In aspects, the first calendar may be shared with the event organizer by the first invitee. In other aspects, the first calendar may be available to the event organizer based on standing permissions or any other means. The first calendar of the first invitee may include at least a first existing calendar event and at least a second existing calendar event. In aspects, an "existing calendar event" is a calendar event that has been scheduled in a calendar of a user and may be accepted or not accepted (e.g., tentative) by the user. The first existing calendar event may be scheduled during a first time period (e.g., at least a start time and end time) and the second existing calendar event may be scheduled during a second time period (e.g., at least a start time and end time). The first and second time periods may be associated with the same or different calendar dates.

At determine operation 106, it may be determined that an open time period is not available within the first calendar during the desired time period for the proposed calendar event. That is, the first calendar may include one or more existing calendar events having scheduled time periods that overlap at least in part with the desired time period. In this case, at least one of the first time period of the first existing calendar event or the second time period of the second existing calendar event may overlap at least in part with the desired time period for the proposed calendar event. An open time period may be defined as a time period for which a calendar is not associated with any existing calendar events. In aspects, an open time period may be designated as "free" (as opposed to "busy" or "tentative") in a calendar.

At retrieve operation 108, at least a first flexibility score for the first existing calendar event and a second flexibility score for the second existing calendar event may be received. As detailed above, a flexibility score may represent a probability that an existing calendar event can or will be rescheduled in response to a conflicting calendar request. Further, as described above, flexibility scores may be calculated based on one or more factors. For instance, the first and second flexibility scores may be calculated based on one or more of: a busyness factor for at least the first invitee of the first existing calendar event and the second existing calendar event, an urgency factor for the first existing calendar event and the second existing calendar event, a location factor indicating a preferred location for the first existing calendar event and the second existing calendar event, an importance factor of at least the first invitee for the first existing calendar event and the second existing calendar event, an interest factor of at least the first invitee for the first existing calendar event and the second existing calendar event, and a time preference factor of at least the first invitee for the first existing calendar event and the second existing calendar event.

In some aspects, to reduce the on-demand processing required when a calendar is retrieved, flexibility scores may be calculated by one or more machine-learning models and stored for later retrieval. For example, the one or more machine-learning models may include a time differential learning model, which generates a first weighted interim score for an existing calendar event based on a remaining time between a scheduled time period for the existing calendar event and the current time. The one or more machine-learning models may further include an event density learning model, which generates a second weighted interim score for the existing calendar event based on an event density of the calendar with which the existing calendar event is associated. An event density may be defined as a number of existing calendar events during a predefined time period within a calendar. The one or more machine-learning models may further include an event importance learning model, which generates a third weighted interim score based on a level of importance to the existing calendar event, and an invitee interest learning model, which generates a fourth weighted interim score based on a level of interest of one or more invites of the existing calendar event. The one or more machine-learning models may also include a flexibility score generator, which generates a flexibility score for the existing calendar event based on aggregating the one or more weighted interim scores.

In some aspects, e.g., when processing resources are available, flexibility scores for existing calendar events may be generated in real time (e.g., at the time that a calendar of an invitee is retrieved) by the one or more machine-learning models. Alternatively, flexibility scores may be calculated in the background (e.g., during downtimes when processing resources are available) and stored for later retrieval. In further aspects, flexibility scores retrieved from storage may be updated in real time (e.g., at the time that a calendar is retrieved) based on changed conditions. Changed conditions may include, for instance, an update to the existing calendar event (e.g., updated scheduled time period, invitees, location, etc.) or updated data influencing one or more of the factors (e.g., updated invitee preferences, updated importance level of an invitee, updated urgency of the calendar event, etc.). In other aspects, flexibility scores may be updated periodically, upon detection of changed conditions, or based on any other update schedule.

At determine operation 110, a proposed time period (e.g., a proposed date, start time and end time) may be determined for the proposed calendar event. For example, where an open time period is not available during the desired time period for the proposed calendar event, the first and second flexibility scores may be evaluated to identify one of the first and second existing calendar events that has a higher probability of being rescheduled in view of the proposed calendar event. For example, if the second flexibility score is higher than the first flexibility score, it can be determined that there is a higher probability that the first invitee will reschedule the second existing calendar event in response to a conflicting calendar event than the first existing calendar event. A conflicting calendar event is a calendar event scheduled during a time period that at least partially overlaps a time period scheduled for another calendar event. In this case, based on the second flexibility score, the proposed time period for the proposed calendar event may be determined to at least partially overlap with the second time period scheduled for the second existing calendar event. That is, based on the second flexibility score, although the proposed calendar event will conflict with the second existing calendar event, there is a high probability that the first invitee will reschedule the second existing calendar event and accept the proposed calendar event.

At send operation 112, an event request for the proposed calendar event at the proposed time may be sent to the first invitee. While the proposed calendar event conflicts with the second existing calendar event, there is a high probability that the first invitee will accept the event request and reschedule the second existing calendar event. In some aspects, when the proposed calendar event is added to the first calendar of the first invitee (either as accepted or tentative), the system may generate a flexibility score for the proposed calendar event in the first calendar.

As should be appreciated, operations 102-112 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 2A:
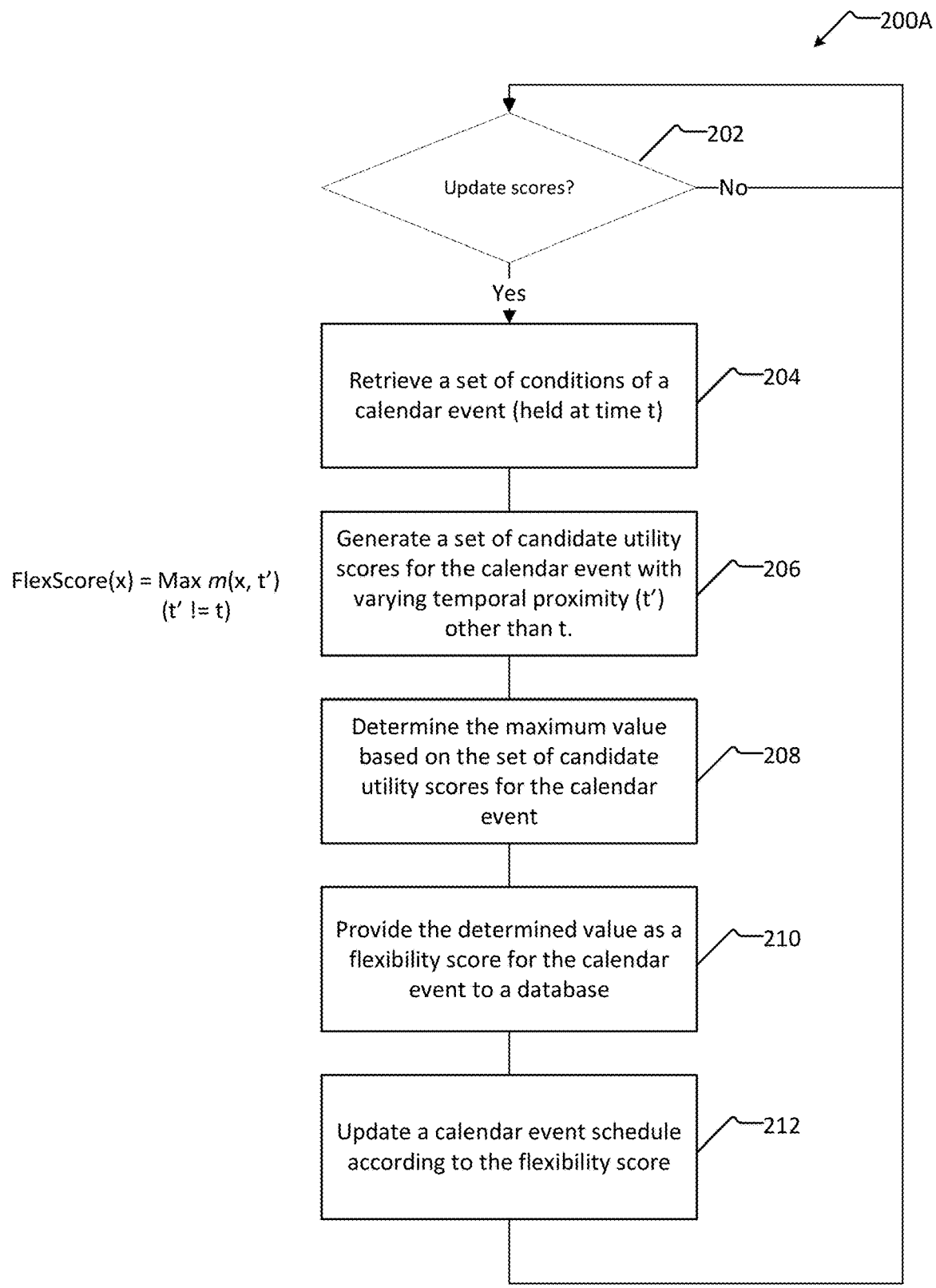
FIGS. 2A-2B illustrate overviews of example systems for generating and maintaining flexibility scores for calendar events.

FIG. 2A Illustrates an overview of an example system for generating and updating flexibility scores of calendar events. A method 200A illustrates a set of processing steps that may be processed automatically on a periodic basis or upon receiving an indication to update flexibility scores.

At a decision operation 202, the system may decide whether to update flexibility scores of calendar events. The decision may be based on a trigger from a timer for periodic updates, receiving an indication of changed conditions, receiving a request to update one or more flexibility scores, or otherwise. In some aspects the system may wait until it becomes appropriate to update flexibility scores (e.g., when processing or other resources are available).

At retrieve operation 204, a set of conditions for a calendar event may be retrieved from a calendar event database or from inputs to an event request for the calendar event. The set of conditions may include a list of invitees for the calendar event, a level of importance of the existing calendar event, date and/or time constraints of the calendar event, a scheduled time period (e.g., date, start time and end time), a facility requirement, an equipment requirement, and any other conditions that may influence scheduling or rescheduling of the calendar event.

At generate operation 206, a set of candidate utility scores for the calendar event over alternative times within a proximity range (t') may be generated. Based on the set of candidate utility scores, an exemplary equation for calculating a flexibility score for the calendar event may be as follows, where the greater the maximum value of the set of candidate utility scores, the higher the flexibility for the calendar event:

$$\text{CandidateFlexibilityScore}(x) = \text{MAX } m(x,t'),$$

where x denotes a set of conditions for a calendar event, scheduled at time t, and where t' is not t. A function of m generates a candidate utility score for a meeting x at time t', which may indicate a fitness of alternative time slots for the meeting. A flexibility score for a meeting is generated by taking the maximum value of a set of candidate utility scores based on particular set of x and t'. In one aspect, where a single alternative time t' is evaluated for any reason (e.g., for a highly limited calendar), rather than a set of candidate utility scores, a single candidate utility score may be generated based on the single alternative time t'. In this case, the value of the single candidate utility score may be taken as the maximum value in satisfaction of the exemplary equation above such that the single candidate utility score is the flexibility score for the calendar event.

In aspects, the set of candidate utility scores of the calendar event may be calculated at alternative times around the scheduled time as potential times for rescheduling, and the maximum score of the set of candidate utility scores may be determined as the flexibility score for the calendar event.

For example, if a meeting is currently scheduled to take place at 9 AM (e.g., time t) on Monday, Oct. 23, 2017, the generate operation 206 may generate a set of candidate utility scores for the calendar event if it were to take place at times t' (e.g., at 7:30 AM, 8 AM, 8:30 AM, 9:30 AM, 10 AM, 11 AM of the same date). A value of the proximity range may be customizable by an event organizer. In the example, the system may generate a set of six candidate utility scores for the calendar event, each indicating a level of flexibility to reschedule the calendar event to commence at respective times t'. Each of the six candidate utility scores may have different values, depending on various reasons including availability of invitees at the respective times t'.

In determine operation 208, the maximum value from the set of candidate utility scores may be determined as the flexibility score of the calendar event. In some cases, if a flexibility score already exists for the calendar event, the flexibility score may be an updated to reflect the determined flexibility score for the calendar event. In this case, the updated flexibility score may incorporate any change in availability of invitees and other changes in the set of conditions for the calendar event.

In provide operation 210, the maximum value (i.e., flexibility score) may be provided to a database as one of the flexibility score or an updated flexibility score for the calendar event. The system may further provide the flexibility score (or the updated flexibility score) of the calendar event for a variety of uses, such as but not limited to notifying the event organizer of the calendar event (or an event organizer of a proposed calendar event) with the flexibility score. Moreover, there may be a reminder or notification when the calendar event has a higher flexibility score and may be more likely to be rescheduled in response to a conflicting calendar event.

In update operation 212, a calendar event schedule may be updated according to the determined flexibility score of the calendar event. In some aspects, calendar applications that feature graphical user interfaces may display calendar events in different colors to depict levels of flexibility (or flexibility scores) of respective calendar events. For instance, some calendar applications may use a lighter color for calendar events with higher flexibility scores while using a darker color for calendar events with lower flexibility scores. In some aspects flexibility scores may be numerically displayed instead of represented based on a color scheme.

In further aspects, one or more alternative dates and times, which are suitable for rescheduling the calendar event, may be proposed based on the particular set of x and t' and respective values of the set of candidate utility scores. Alternatively, in some cases, canceling a calendar event may be preferable to rescheduling the calendar event. While the exemplary definition for flexibility scores, MAX m (x, t'), has been simplified for illustrative purposes, the function could be more complex. For example, in addition to accounting for utility scores of alternative time slots, the function could take into account the probability of canceling the calendar event due to low importance. That is, when there are no alternative time slots for rescheduling an existing calendar event that would work for all attendees, the existing calendar event may be canceled in view of scheduling a more important meeting. In the case of canceling a calendar event, organizers and/or invitees may revoke and/or decline such calendar event.

As should be appreciated, operations 202-212 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 2B:
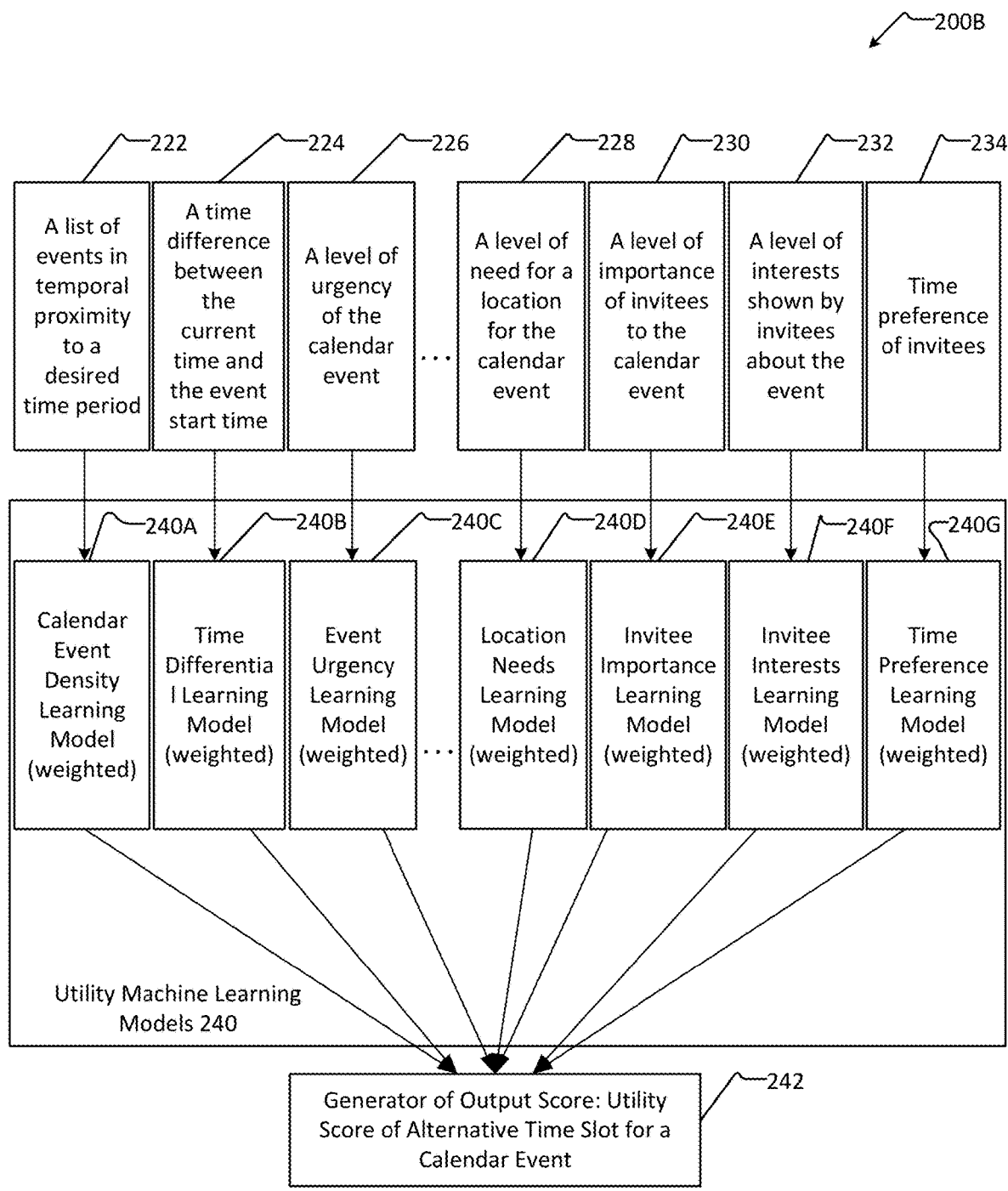

FIG. 2B illustrates an overview of an example system for generating and/or updating flexibility scores of calendar events using machine learning model processing. A method 200B uses one or more factors to generate a flexibility score as an output from machine learning model processing. For example, values of factors (222-234) for a calendar event may be used as an input to the Utility Machine Learning Models 240 to collectively generate a flexibility score for the calendar event.

Utility Machine Learning Models 240 may comprise various learning models that are optimized for specific purposes. For instance, Calendar Event Density Learning Model (weighted) 240A may process a list of existing calendar events (222) in temporal proximity as a factor to a desired time period of the proposed calendar event for at least one calendar of at least one invitee to the proposed calendar event. The Calendar Event Density Learning Model (weighted) 240A may generate an indication of a calendar event density for the at least one calendar. Based on the calculated calendar event density for the at least one calendar, a first interim utility score may be generated for an existing calendar event (e.g., among the list of existing calendar events) in temporal proximity to the desired time period. The first interim utility score for the existing calendar event may indicate, for instance, a probability that the existing calendar event may be rescheduled based on the calendar event density of the at least one calendar in proximity to the calendar event. For instance, the first interim utility score may be lower (thus, less flexible) when the calendar event density is high during the desired time period in temporal proximity to the calendar event. That is, the calendar event may be less likely to be rescheduled when the calendar event density in proximity to the calendar event is high and nearby time periods are not readily available for rescheduling the calendar event. In some cases, the first interim utility score may be assigned a first weight that is representative of a respective importance or influence of the first interim utility score relative to other interim utility scores in determining an overall flexibility score for the calendar event. In some aspects, the maximum value of interim utility scores may be selected as the overall flexibility score for the calendar event.

In some aspects, Time Differential Learning Model (weighted) 240B may process a time difference between the current time and the start time of the calendar event (224) to generate a second interim utility score that indicates a probability for rescheduling the calendar event based on a proximity of the calendar event to the current time. In particular, scheduling of a calendar event may become more difficult and complex, and thus less flexible, as the current time nears the scheduled time for the calendar event. The decreasing flexibility as the time difference decreases takes into account that invitees of the calendar event may have already undertaken preparations for attending the calendar event and it may be difficult or inconvenient to reschedule on short notice. Moreover, other constraints may make it more difficult to reschedule the calendar event on short notice, e.g., availability of facilities, availability of equipment, etc. In some cases, the second interim utility score may be assigned a second weight that is representative of a respective importance or influence of the second interim utility score relative to other interim utility scores in determining the overall flexibility score for the calendar event. In some aspects, the maximum value of interim utility scores may be selected as the overall flexibility score for the calendar event.

Event Urgency Learning Model (weighted) 240C may process a level of urgency 226 of the calendar event. Urgency of a calendar event may be determined based on any number of parameters, e.g., the importance of topics associated with the calendar event, the proximity of a deadline to the calendar event, the number of invitees to the calendar event, etc. For example, when a calendar event is near a deadline associated with the topic of the calendar event, the calendar event may be more urgent and less flexible in rescheduling because it may not be possible to reschedule the calendar event prior to the deadline. Based on the urgency of the calendar event, the Event Importance Learning Model (weighted) may generate a third interim utility score representing a probability that the calendar event can or will be rescheduled in response to a conflicting calendar event. In some cases, the third interim utility score may be assigned a third weight that is representative of a respective importance or influence of the third interim utility score relative to other interim utility scores in determining the overall flexibility score for the calendar event. In some aspects, the maximum value of interim utility scores may be selected as the overall flexibility score for the calendar event.

Location Needs Learning Model (weighted) 240D may process a level of need for a particular location or facility for the calendar event to generate a fourth interim utility score. In some aspects, a level of need for a particular location 228 may be retrieved for the calendar event. Different calendar events may have different requirements for locations or facilities for conducting the calendar event. For instance, a calendar event may have a capacity requirement associated with the number of in-person invitees; equipment requirements including overhead projectors, audio, and telecommunication systems; seating arrangement requirements such as theater-style seating or round-table seating; geographic location requirements based on in-person invitees; and the like. As different locations or facilities may be equipped differently, some calendar events may have a higher need for a particular location or facility than other calendar events. Accordingly the fourth interim utility score will be higher. In some cases, the fourth interim utility score may be assigned to a fourth weight that is representative of the importance or influence of the fourth interim utility score relative to other interim utility scores in determining the overall flexibility score for the calendar event. In some aspects, the maximum value of interim utility scores may be selected as the overall flexibility score for the calendar event.

Invitee Importance Learning Model (weighted) 240E may process level of importance of invitees to the calendar event to generate a fifth interim utility score for the calendar event in terms of availability of important (e.g., high-level) invitees. In some aspects, a level of importance 230 may be retrieved for each invitee to the calendar event. Availability of important invitees who are required to attend the calendar event may influence a probability of rescheduling the calendar event in response to a conflicting calendar event. For example, if the CEO of a company is an invitee to a calendar event, the probability that the calendar event will be rescheduled is lower and thus the fifth interim utility score will be lower. In some cases, the fifth interim utility score may be assigned a fifth weight that is representative of a respective importance or influence of the fifth interim utility score relative to other interim utility scores in determining the overall flexibility score for the calendar event. In some aspects, the maximum value of interim utility scores may be selected as the overall flexibility score for the calendar event.

Invitee Interests Learning Model (weighted) 240F may process levels of interests detected or estimated for the invitees of the calendar event. Invitee interest with respect to the calendar event 232 may influence the probability that the calendar event will be rescheduled in response to a conflicting calendar event. The Invitee Interests Learning Model (weighted) 240F may generate a sixth interim utility score representative of the probability that the calendar event can or will be rescheduled based on invitee interest in the calendar event. For instance, calendar events associated with a higher invitee interest may be less likely to be rescheduled. Invitee interest may be determined or estimated based on any suitable means, e.g., based on evaluating messages exchanged between invitees regarding the calendar event, based on social networking chatter associated with the calendar event, based on invitee preferences (e.g., for the topic), etc. For instance, contents of emails between invitees may be evaluated to determine a frequency of emails associated with the calendar event. Having higher frequency of such email exchanges may indicate a higher invitee interest in the calendar event. In some cases, Invitee Interests Learning Model (weighted) 240F may aggregate invitee interest levels to generate the sixth interim utility score for the calendar event. In some cases, the sixth interim utility score may be assigned a sixth weight that is representative of a respective importance or influence of the sixth interim utility score relative to other interim utility scores in determining the overall flexibility score for the calendar event. In some aspects, the maximum value of interim utility scores may be selected as the overall flexibility score for the calendar event.

Time Preference Learning Model (weighted) 240G may process a seventh interim utility score for the calendar event based on time preferences of invitees 234 of the calendar event. For instance, time preference information for invitees may be retrieved from a user preference database (e.g., user profile database 310). For example, some invitees may prefer early morning meetings, while other invitees may prefer afternoon meetings. For example, if most of the invitees prefer early morning meetings, but the calendar event is scheduled during the afternoon, there may be a higher probability that the calendar event will be rescheduled in response to a conflicting calendar event. In contrast, if most of the invitees prefer to schedule afternoon meetings, there may be a lower probability that the calendar event will be rescheduled. Based on the time preference information, Time Preference Learning Model (weighted) 240G may generate the seventh interim utility score based on an aggregation of invitee time preferences. In some cases, the seventh interim utility score may be assigned a seventh weight that is representative of a respective importance or influence of the seventh interim utility score relative to other interim utility scores in determining the overall flexibility score for the calendar event. In some aspects, the maximum value of interim utility scores may be selected as the overall flexibility score for the calendar event.

There may be additional types of learning models to generate weighted scores within Flexibility Machine Learning Models 240. In aspects, a generator 242 may aggregate the interim utility scores (taking into account any associated weightings) to generate an overall flexibility score for the calendar event. In some cases, values of weights for the various interim utility scores may be tunable by the generator 242. For instance, values of weights may dynamically change based on various parameters, such as times of the year, changing invitee preferences, changing invitee interests, changing levels of invitee importance, etc. Additionally, the Utility Machine Learning Models 240 may learn while processing values of the aforementioned factors to generate interim utility scores for a calendar event. In some aspects, use of Utility Machine Learning Model 240 may able significant improvement in scheduling proposed calendar events over conventional, manually-intensive system, by generating respective flexibility scores for existing calendar events based on a complex set of factors even as the calendars of invitees, as well as weights among factors, may change dynamically. In some aspects, the maximum value of interim utility scores may be selected as the overall flexibility score for the calendar event.

In some aspects, interim utility scores may be generated based on various factors affecting scheduling calendar events, and the scores may then be directly transformed into a flexibility score. Additionally or alternatively, rather than direct transformation, the aforementioned factors and alternative time slots may be used to evaluate the utility (=fit) function m(x, t') for each alternative (=candidate) time slot t'. Here, x denotes the set of factors and condition of a calendar event m and t' is a time that is other than the currently scheduled time t of the calendar event.

As should be appreciated, components 222-242 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3A:
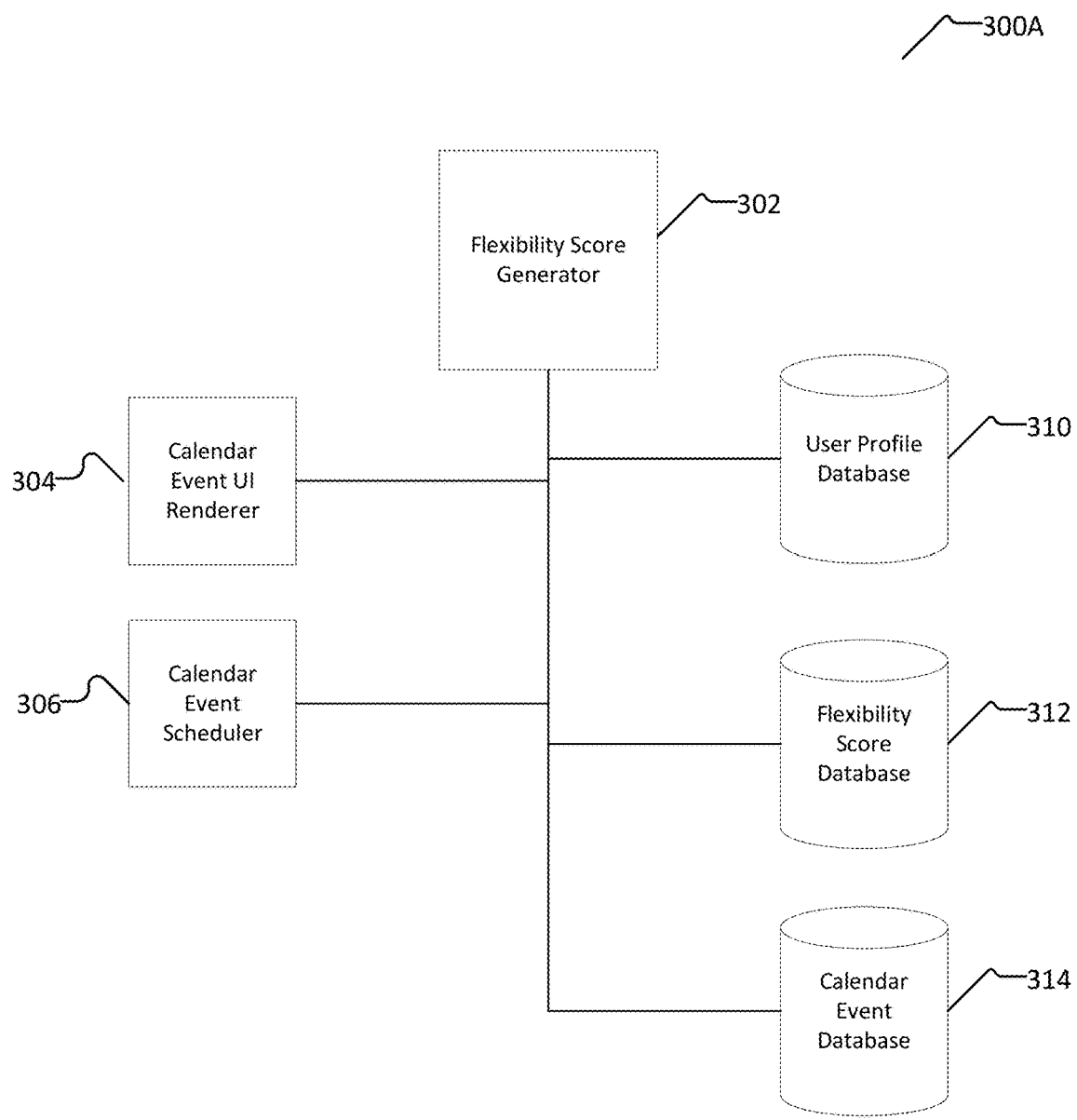
FIGS. 3A-3B illustrate block diagrams of example components of the disclosed calendar event scheduler.

FIG. 3A illustrates block components of an example system for scheduling a proposed calendar event using a flexibility score generator.

System 300A may store, manage, and provide information about calendar events and flexibility scores of respective calendar events. Flexibility Score Generator 302 may retrieve conditions of existing calendar events, and generate flexibility scores for the existing calendar events based on processing by machine learning models. Flexibility Score Generator 302 may store generated flexibility scores in Flexibility Score Database 312. Calendar Event UI (User Interface) Renderer 304 may display and update calendar events as well as provide indications of respective flexibility scores for the calendar events. For instance, Calendar Event UI Renderer 304 may render multiple different flexibility scores with respect to calendar events in different colors, color shades, or patterns. For example, a light blue color may be provided for highly flexible calendar events, while a darker blue color may be provided for less flexible calendar events. Calendar Event Scheduler 306 may facilitate scheduling proposed calendar events based on the conditions specified for the proposed calendar events by providing flexibility scores for existing calendar events.

User Profile Database 310 may contain profiles of users in the system, including a name of the user, affiliated group and rank within an organization, contact information, user preferences, etc. Flexibility Score Database 312 may store and manage flexibility scores for calendar events. In some aspects, one flexibility score may be stored for each calendar event and may be indexed based on calendar event identifiers or other schema. Calendar events with more flexibility for accommodating rescheduling may have a higher flexibility score. Calendar Event Database 314 may store and manage calendar events. For instance, a record for a calendar event may contain a calendar event identifier, a title of the calendar event, a list of invitees, a level of invitee importance for attendance (e.g. essential, optional, etc.), a scheduled date, start time and end time, a location, a level of importance of the calendar event, etc. In some cases, the record may include estimates for a level of invitee interest in the calendar event, invitee time preferences, etc. In other cases, such information may be stored in other databases, e.g., the User Profile Database 310. Email Mailbox Database 316 may store and manage emails. In some aspects, topics being discussed via emails by invitees may be analyzed to determine a level of the invitees' interests in calendar events being scheduled. Flexibility Score Generator 302 may access and examine contents of emails in mailboxes used by invitees to identify a set of emails that relate to topics of calendar events being scheduled.

Figure 3B:
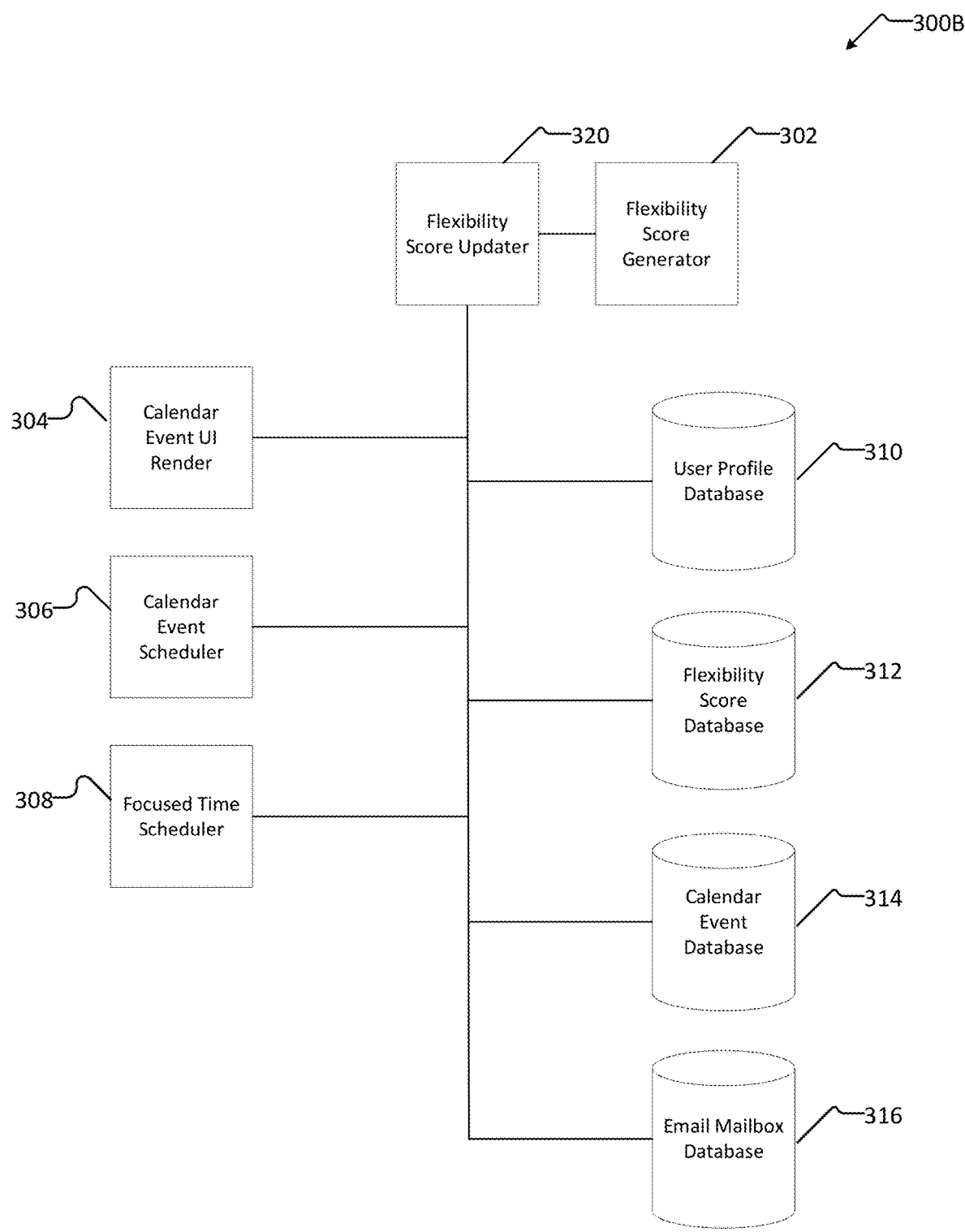

FIG. 3B illustrates block diagrams of example systems of calendar with automatic updates to flexibility scores as well as an automatic focus-time generator. Flexibility Score Updater 320 may send commands at appropriate times to Flexibility Score Generator 302 to regenerate and update flexibility scores of calendar events. For instance, Flexibility Score Updater 320 may be implemented as an agent component that is periodically executed in the background. In some aspects, Flexibility Score Updater 320 may be triggered to execute when a proposed calendar event is being generated, e.g., by inputting a suggested date, desired time period and/or one or more invitees for the proposed calendar event.

Focused Time Scheduler 308 may schedule one or more focused time for a requestor. In some aspects, Focused Time Scheduler 308 may schedule focused time periods for individual users to concentrate on one or more topics that the individuals deems necessary. Scheduling and allocation of focused time periods may enable an individual to devote independent work time to a topic or project. However, such a focused time period may be more flexible than a calendar event scheduled with other individuals. In some aspects, focused time periods may be allocated in a manner that is similar to a calendar event, but the event organizer may be the sole invitee of the Focused Time calendar event. A level of importance and personal interest in the Focused Time may be set as high, but other factors (e.g., urgency, invitee importance, etc.) may operate to lower an assigned flexibility score for the Focused Time calendar event.

As should be appreciated, the various methods, devices, components, etc., described with respect to FIGS. 3A and 3B are not intended to limit the systems and methods to the particular components described. Accordingly, additional topology configurations may be used to practice the methods and systems herein and/or some components described may be excluded without departing from the methods and systems disclosed herein.

Figure 4A:
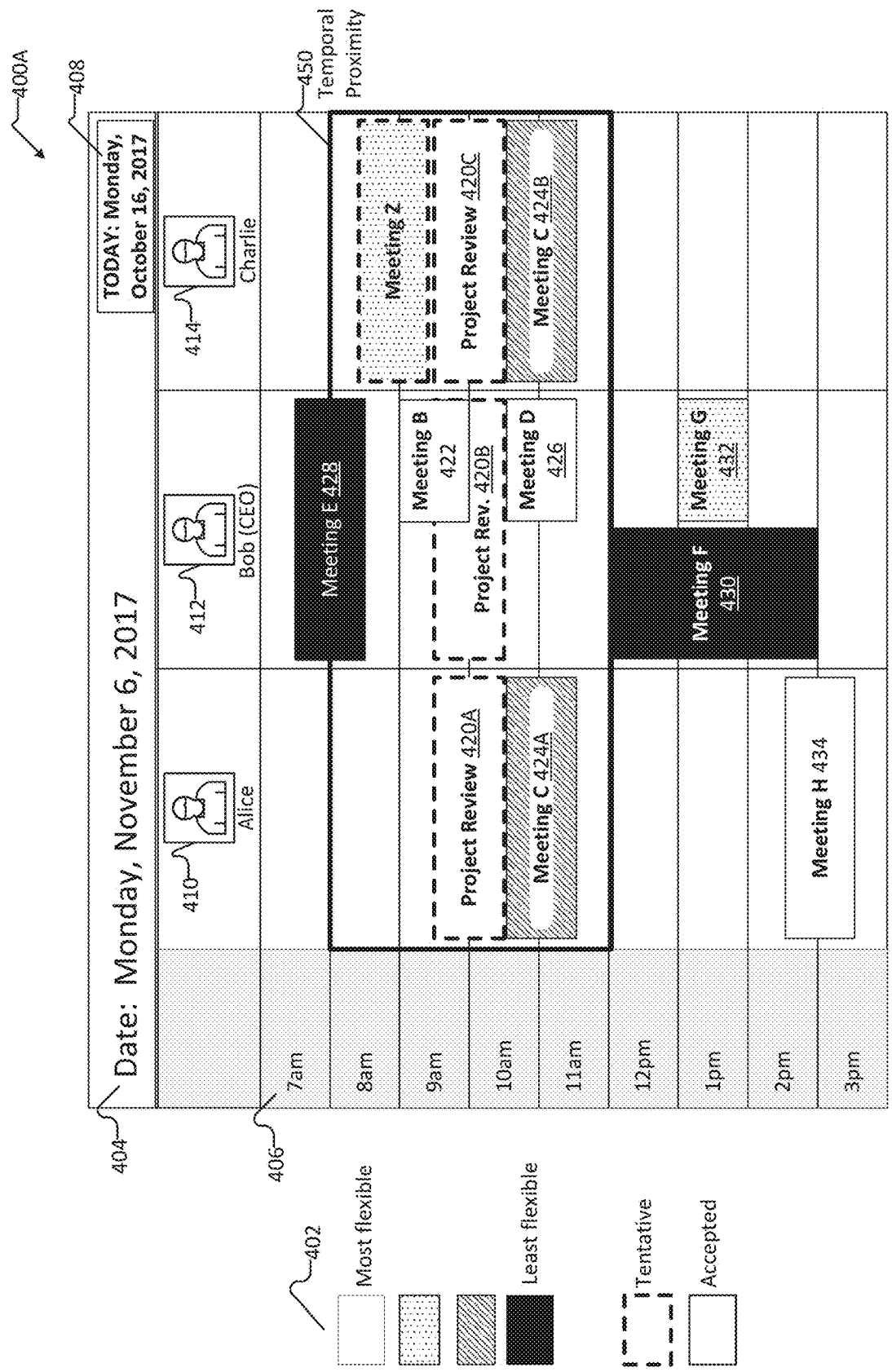
FIGS. 4A-4C illustrate examples of a graphical user interface (GUI) according to an example system.

FIG. 4A depicts a graphical user interface 400A displaying calendars with multiple people according to an example system. Interface 400A includes a pattern legend pane 402, a date pane 404, time pane 406, and calendars for respective invitees Alice 410, Bob 412, and Charlie 414. The interface 400A shows an example calendar for Monday, Nov. 6, 2017, along with an indication of today's date 408, Monday, Oct. 16, 2017. In this example, Alice 410 and Charlie 414 are employees, and Bob 412 is the Chief Executive Officer (CEO), the highest ranked person in the organization. Bob 412 has Meeting B 422 between 9 am and 10 am. Alice 410 and Charlie 414 have Meeting C 424A and 424B, respectively, between 10:30 am and 11:30 am. Bob 412 has Meeting D 426 between 10:30 am and 11:30 am, Meeting E 428 between 7:30 am and 8:30 am, and Meeting F 430 between 11:30 am and 3 pm. Bob 412 also has Meeting G 432, which is in conflict with Meeting F 430 between 1 pm and 2 pm. Alice 410 has Meeting H 434 scheduled at 2:30 pm and 3:30 pm.

Flexibility levels of respective calendar events may be shown based on rendering patterns of the calendar events, as illustrated by shade codes 402. For instance, calendar events in solid black may be the least flexible. Calendar events in a darker shade may be less flexible than those in a lighter shade. Calendar events that are the most flexible may be in a white color. The flexibility levels reflect flexibility scores of respective calendar events, e.g., as generated by Flexibility Score Generator 302.

As illustrated, the meeting organizer may be scheduling a new calendar event, "Project Review." The meeting organizer may have specified a time range for the Project Review to be sometime between Sam and noon, and Alice 410, Bob 412, and Charlie 414 may be required invitees. The time range condition may be illustrated by a solid frame between Sam and noon for the three invitees. Based on the conditions requested for the new calendar event "Project Review," a suggested time may be shown between 9:30 am and 10:30 am. The proposed new calendar event Project Review 420A is shown under Alice 410, the proposed new calendar event 420B is shown under Bob 412, and similarly the proposed new calendar event 420C is shown under Charlie 414. The proposed Project Review calendar event 420 in FIG. 4B may be shown by dotted or dashed outlining because the proposed calendar event 420 represents a suggestion by the system that has the highest likelihood of being accepted by invitees in light of the flexibility levels of the various conflicting calendar events on the invitees' calendars. The meeting organizer may acknowledge and accept the suggestion or may override the suggestion (e.g., based on a personal preference of the meeting organizer) to finalize the scheduling of the proposed calendar event. A scheduled calendar event, e.g., a calendar event for which a meeting request has been sent to invitees, may have solid outlining. If Bob 412 accepts the new "Project Review" calendar event, Meeting B 422 would need to be rescheduled. However, based on the flexibility analysis of the various existing calendar events on the invitees' calendars described herein, Meeting B 422 is the most flexible conflicting calendar event with the highest likelihood of being rescheduled by Bob 412 in favor of accepting proposed calendar event 420.

Figure 4B:
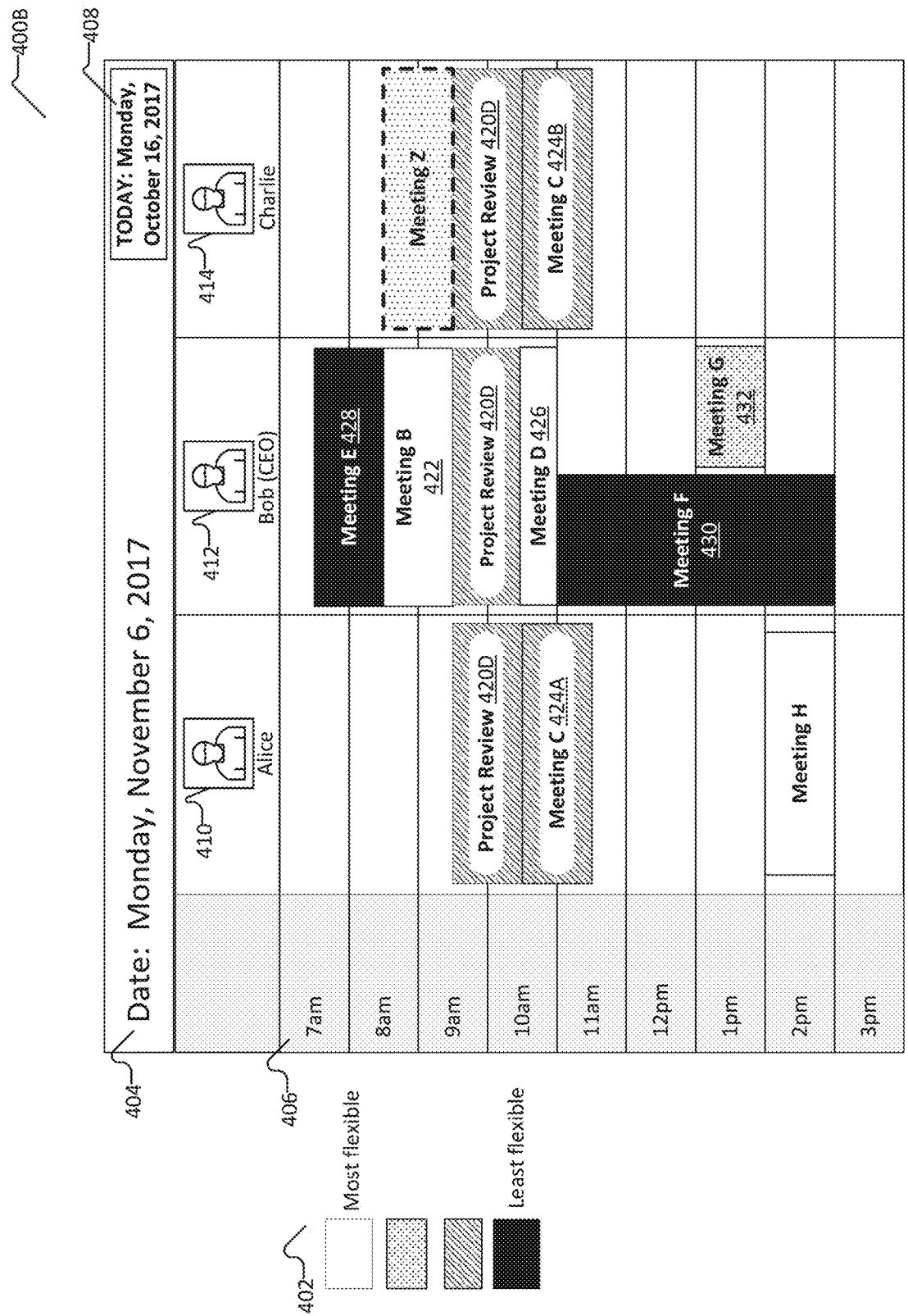

FIG. 4B illustrates an example of a graphical user interface (GUI) according to an example system. The calendar GUI illustrates the result of scheduling the proposed calendar event 420D (entitled "Project Review") between 9:30 am and 10:30 am by sending a meeting request to invitees Alice 410, Bob 412, and Charlie 414. In this example, Meeting B 422, which had the highest flexibility score, has been rescheduled for a timeslot between 8:30 am and 9:30 am. Upon scheduling the Project Review calendar event 420D, a flexibility analysis of calendar event 420D may result in a medium-low flexibility illustrated by dark shading.

Figure 4C:
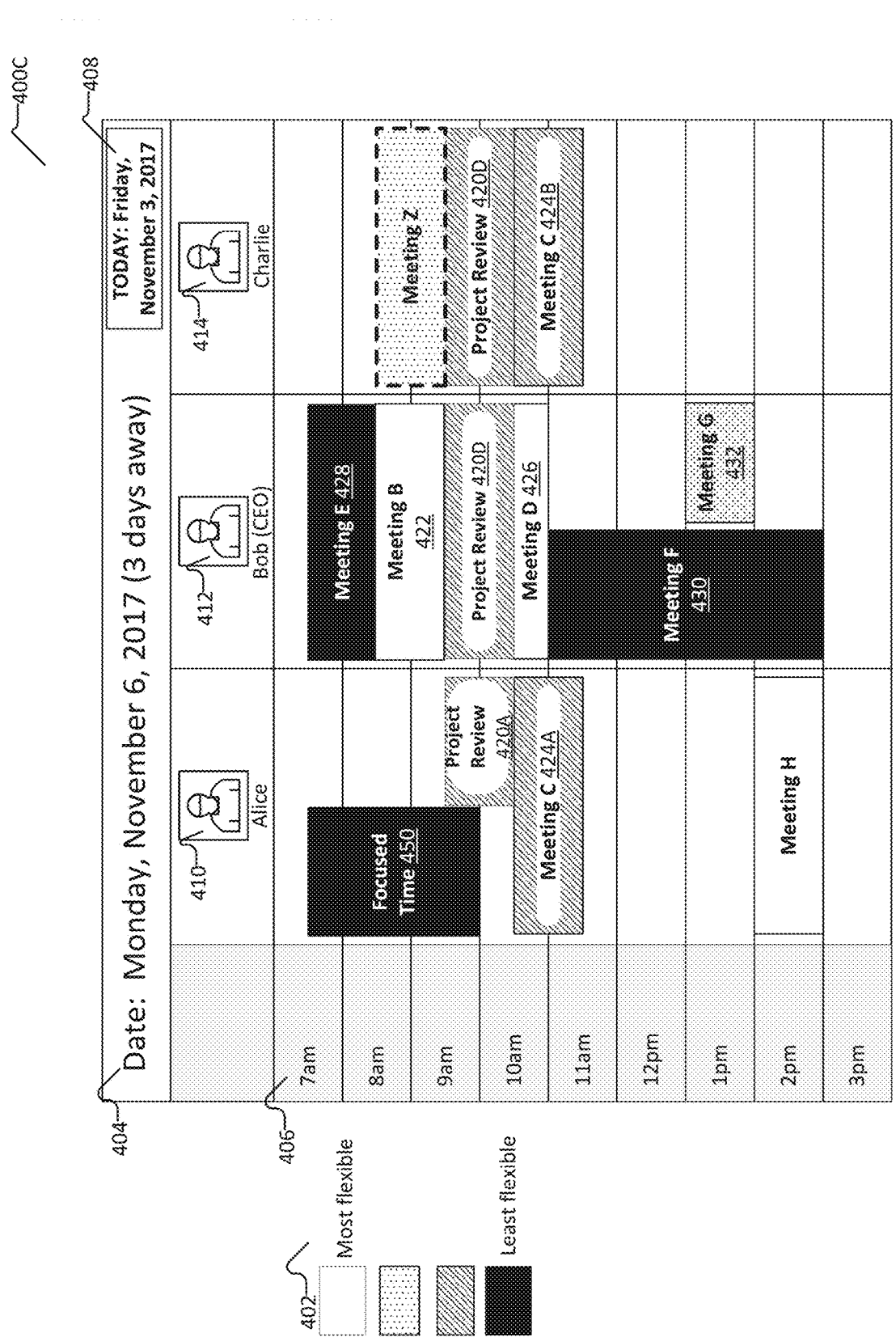

FIG. 4C illustrates examples of a graphical user interface (GUI) according to an example system, particularly when Alice 410 wishes to allocate Focused Time calendar event 450. In some aspects, "Focused Time" is a calendar event that is allocated for self-activity time. The Focused Time may be allocated to concentrate on some task without interruption. For instance, Alice 410 may have a number of calendar events scheduled on Monday, Nov. 6, 2017, as shown in FIG. 4A. For instance, Alice 410 has a Project Review 420A starting at 9:30 am and ending at 10:30 am. The Project Review 420A is followed by Meeting C 424A, starting at 10:30 am and ending at 11:30 am. Alice 410 would like to allocate 150 minutes for herself to concentrate on some task without interruption during the morning hours of that day. In some aspects, Alice 410 may attempt to schedule a new calendar event for herself as the Focused Time with duration of 150 minutes by specifying a desired time period sometime between 7:30 am and noon.

In this case, similar to the steps illustrated in FIG. 1, the calendar application may evaluate alternative times for Project Review 420A and/or Meeting C 424A in Alice's calendar. As should be appreciated, in this case, only Alice's calendar may be impacted as scheduling Focused Time does not involve other users (e.g., invitees). For example, a set of conditions of the Focused Time may be retrieved (see, e.g., operation 102). Alice's calendar may be retrieved for the desired time period (similar to operation 104). Based on Alice's calendar, it may be determined that the duration of 150 minutes is not currently available during the morning of Nov. 6, 2017 (desired time period) (see, e.g., operation 106). In this case, flexibility scores of existing calendar events during the desired time period, such as the Project Review 410A and the Meeting C 424A, may be retrieved from storage (see, e.g., operation 108) and/or determined/updated based on a set of candidate utility scores associated with each existing calendar event (see, e.g., operation 206). Based on the flexibility scores of the existing calendar events, a candidate time for scheduling the Focused Time may be determined (see, e.g., operation 110). In the example, as illustrated by FIG. 4C, a candidate time period that starts at 7:30 am and ends at 10:00 am may be proposed for scheduling the Focused Time based on the flexibility scores of the two existing calendar events. In particular, a flexibility score of Project Review 420A may be determined to be lower than the conditions (e.g., high priority) for scheduling the Focused Time.

As illustrated, the Project Review calendar event 420D, which was originally scheduled between 9:30 am and 10:30 am and analyzed to have medium-low flexibility may now need to be rescheduled or canceled to accommodate Focused Time 450 calendar event scheduled by Alice 410.

As should be appreciated, the various methods, devices, components, etc., described with respect to FIGS. 4A through 4C are not intended to limit the systems and methods to the particular components described. Accordingly, additional topology configurations may be used to practice the methods and systems herein and/or some components described may be excluded.

Figure 5:
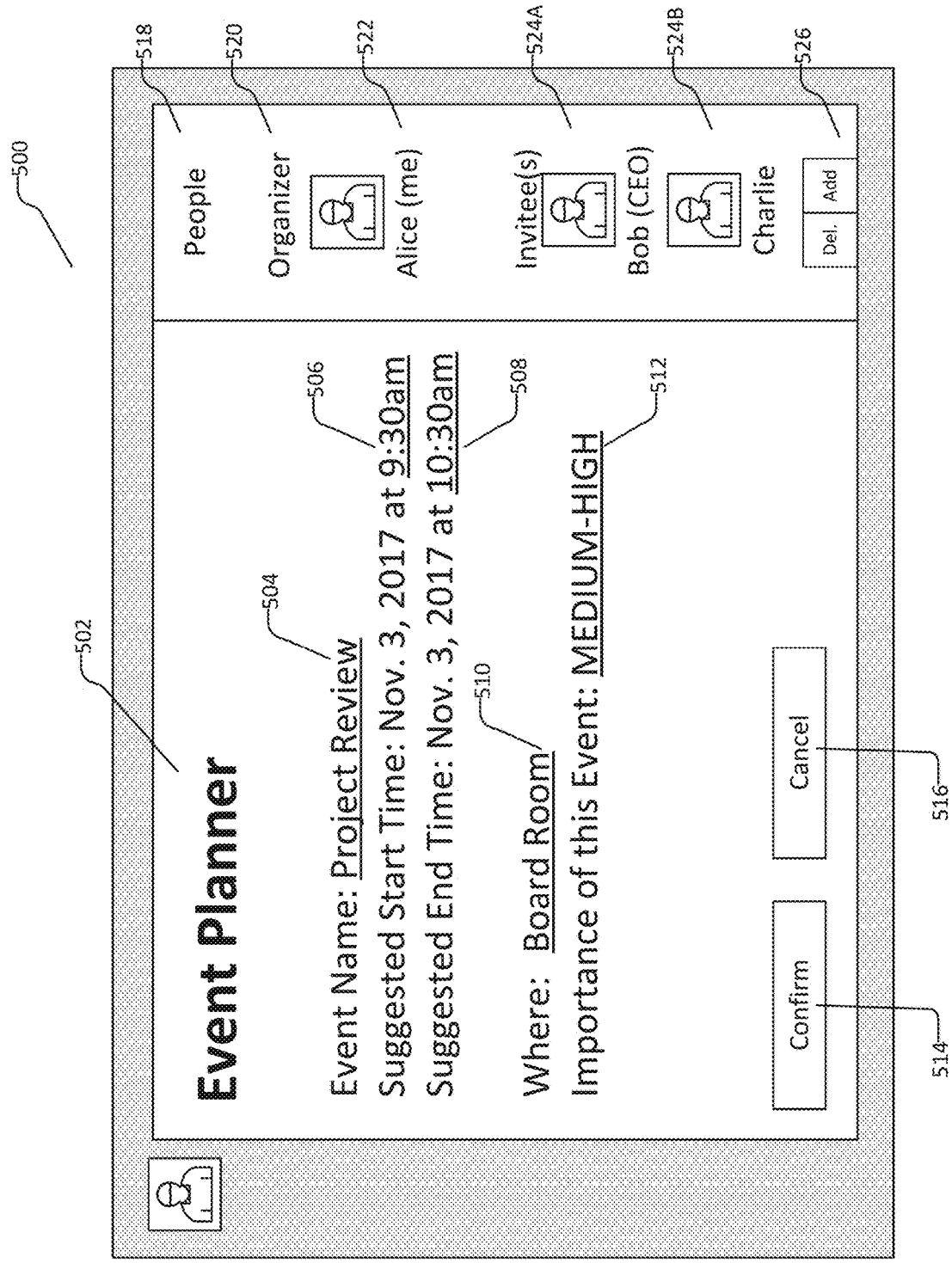
FIG. 5 illustrates a graphical user interface (GUI) according to an example system.

FIG. 5 depicts a graphical user interface (GUI) 500 displaying Event Planner 502 to an event organizer, according to an example system. Interface 500 may include an Event Planner pane 502 for event information and People pane 518, providing a list of the organizer and proposed invitees. The Event Planner pane 502 may display information about the proposed calendar event, such as but not limited to Event Name 504, Suggested Start Time 506, Suggested End Time 508, Suggested Location 510 and Importance 512 of the calendar event. These fields may be editable by the event organizer. As shown, Alice 522 is the meeting organizer 520 of the proposed calendar event. Bob (CEO) and Charlie are two invitees 524A and 524B, respectively. Event Name 504 is shown as Project Review. Suggested Start Time 506 is proposed at 9:30 am on Nov. 3, 2017, and Suggested End Time 508 is proposed at 10:30 am on Nov. 3, 2017. The Suggested Location 510 of the event is the Board Room and the Importance 512 of this event is MEDIUM-HIGH.

As illustrated, the event organizer may add and delete invitees of the calendar event by selecting "Add" and "Del" buttons 526, respectively. The event organizer may select the Confirm button 514 to confirm scheduling of the new calendar event, or select the Cancel button 516 to cancel the scheduling. The information about the proposed calendar event may be stored in Calendar Event Database 314. After the proposed calendar event is scheduled (e.g., meeting requests have been sent to the invitees), Flexibility Score Generator 302 may analyzed the scheduled calendar event for flexibility. For instance, a flexibility analysis of the scheduled calendar event may include analyzing one or more attributes or parameters of the scheduled calendar event, such as the Importance 512 value (MEDIUM-HIGH), Location 510, invitees 524A/B, Start Time 506 and End Time 508, and the like, by Utility Machine Learning Models 240. In this case, Utility Machine Learning Models 240 may determine that the Importance 512 is the most significant factor in determining a flexibility of the scheduled calendar event. For instance, calendar events with an importance level of medium high may correspond to a flexibility level of MEDIUM-LOW. However, as should be appreciated, any of the factors discussed above may be evaluated and aggregated to calculate a flexibility score for the scheduled calendar event.

As should be appreciated, the various methods, devices, components, etc., described with respect to FIG. 5 is not intended to limit the systems and methods to the particular components described. Accordingly, additional topology configurations may be used to practice the methods and systems herein and/or some components described may be excluded without departing from the methods and systems disclosed herein.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
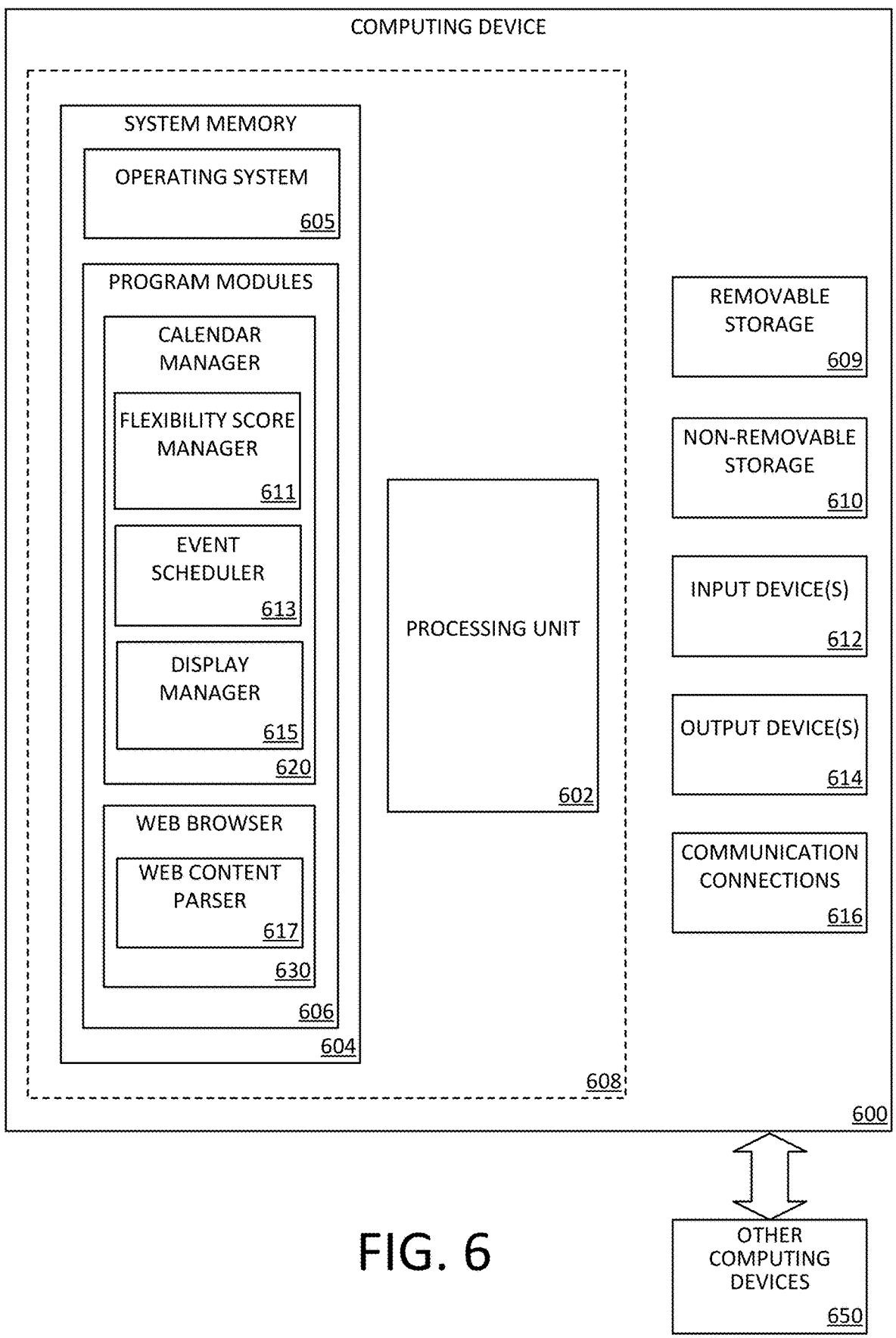
FIG. 6 illustrates a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing a calendar manager 620 on a computing device, including computer executable instructions for calendar manager 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for performing the various aspects disclosed herein. For example, the one or more program modules 606 may include a Calendar Manager 620 for managing display of one or more graphical user interface objects and user interactions.

As illustrated by FIG. 6, Calendar Manager 620 may include one or more components, including a Flexibility Score Manager 611 for generating and updating flexibility scores for calendar events, an Event Scheduler 613 for scheduling and rescheduling calendar events based on various constraints and conditions including flexibility scores, and a Display Manager 615 for managing presentation of calendar events through graphical user interface. As illustrated by FIG. 6, Calendar Manager 620 may have access to Web Browser 630, which may include or be associated with a web content parser to render and control calendar contents on the web browser. In further examples, the one or more components described with reference to FIG. 6 may be combined on a single computing device 600 or multiple computing devices 600.

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., Calendar Manager 620) may perform processes including, but not limited to, the aspects, as described herein. Other program modules that may be used in accordance with aspects of the present disclosure, and in particular for managing display of graphical user interface objects, may include Flexibility Score Manager 611, Event Scheduler 613, Display Manager 615, Web Browser 630, and/or Web Content Parser 617, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As should be appreciated, FIG. 6 is described for purposes of illustrating the present methods and systems and are not intended to limit the disclosure to a particular sequence of steps or a particular combination of hardware or software components.

Figure 7A:
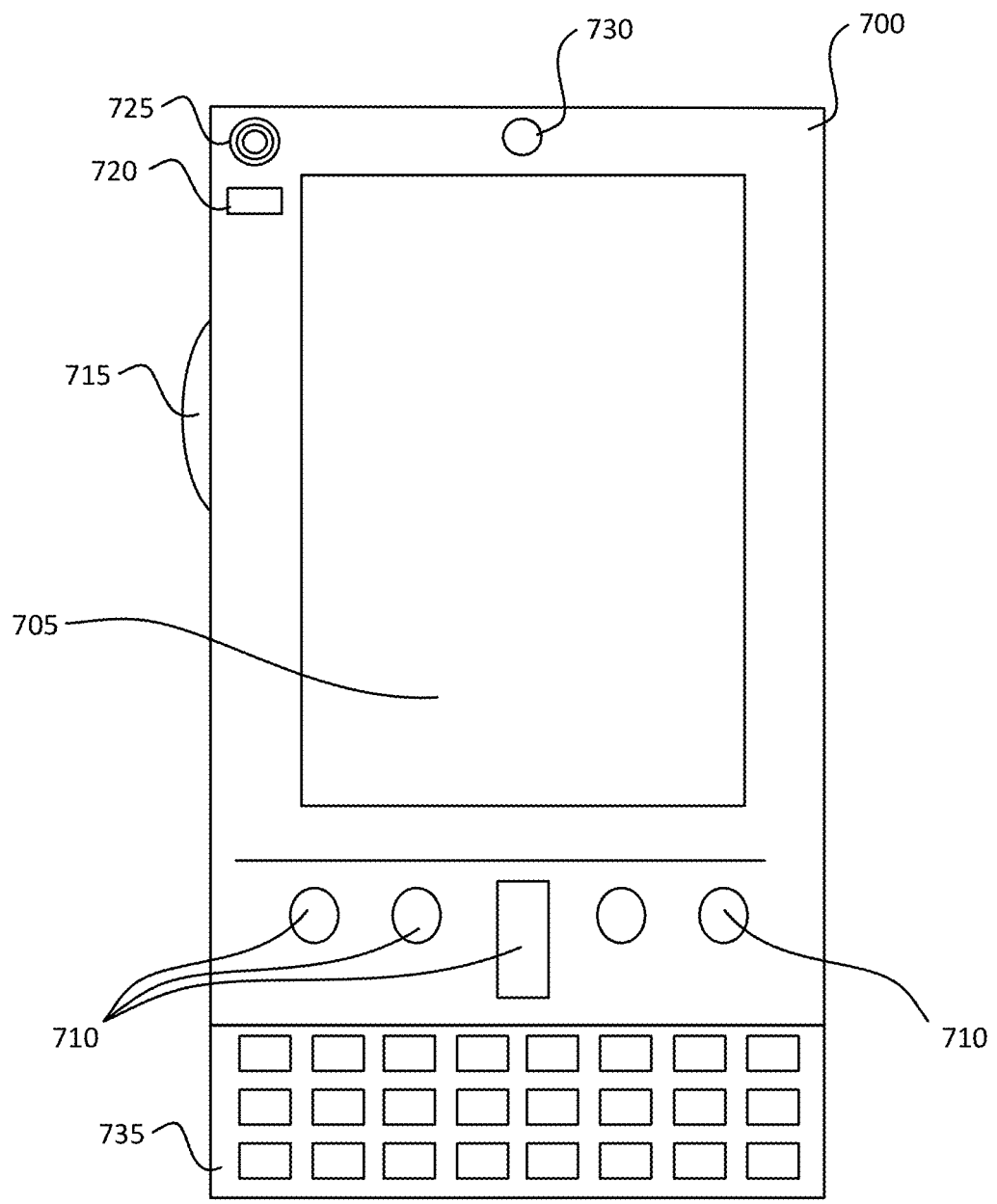
FIGS. 7A and 7B are simplified block diagrams of a mobile computing device with which aspects of the present disclosure may be practiced.
Figure 7B:
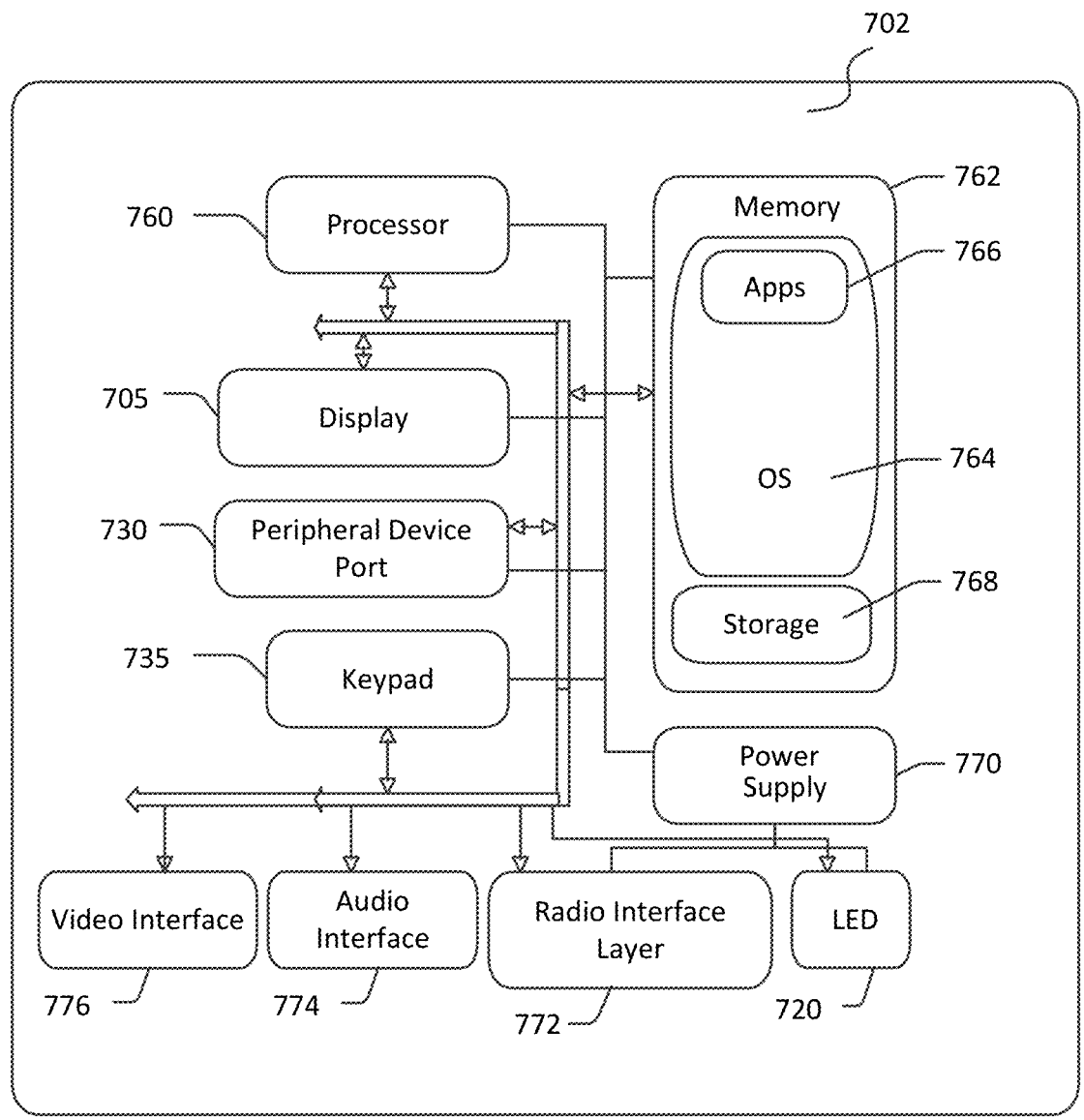

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing a consensus determination application as described herein (e.g., message parser, suggestion interpreter, opinion interpreter, and/or consensus presenter, etc.).

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device port 730 (e.g., on-board camera) to record still images, video stream, and the like. Audio interface 774, video interface 776, and keypad 735 may be operated to generate one or more messages as described herein.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 7A and 7B are described for purposes of illustrating the present methods and systems and are not intended to limit the disclosure to a particular sequence of steps or a particular combination of hardware or software components.

Figure 8:
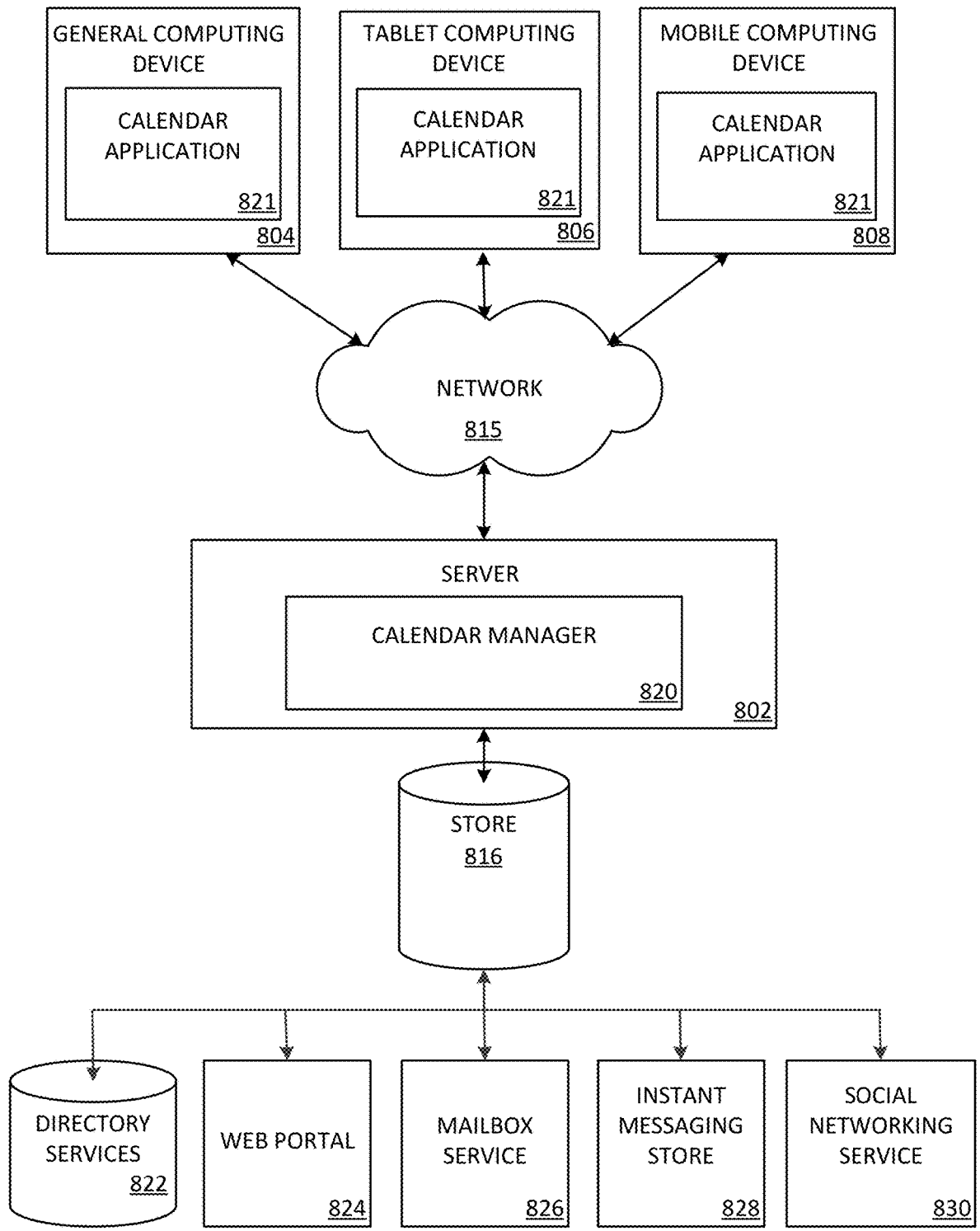
FIG. 8 is a simplified block diagram of a distributed computing system in which aspects of the present disclosure may be practiced.

FIG. 8 illustrates one aspect of the architecture of a system for processing data received at a computing system from a remote source, such as a general computing device 804 (e.g., personal computer), tablet computing device 806, or mobile computing device 808, as described above. Content displayed at server device 802 may be stored in different communication channels or other storage types. For example, various messages may be received and/or stored using directory services 822, a web portal 824, a mailbox service 826, an instant messaging store 828, or a social networking service 830. The calendar application 821 may be employed by a client that communicates with server device 802, and/or the calendar manager 820 may be employed by server device 802. The server device 802 may provide data to and from a client computing device such as a general computing device 804, a tablet computing device 806 and/or a mobile computing device 808 (e.g., a smart phone) through a network 815. By way of example, the computer system described above with respect to FIGS. 1-5 may be embodied in a general computing device 804 (e.g., personal computer), a tablet computing device 806 and/or a mobile computing device 808 (e.g., a smart phone). Any of these embodiments of the computing devices may obtain content from the store 816, in addition to receiving graphical data useable to either be pre-processed at a graphic-originating system or post-processed at a receiving computing system.

As should be appreciated, FIG. 8 is described for purposes of illustrating the present methods and systems and is not intended to limit the disclosure to a particular sequence of steps or a particular combination of hardware or software components.

Figure 9:
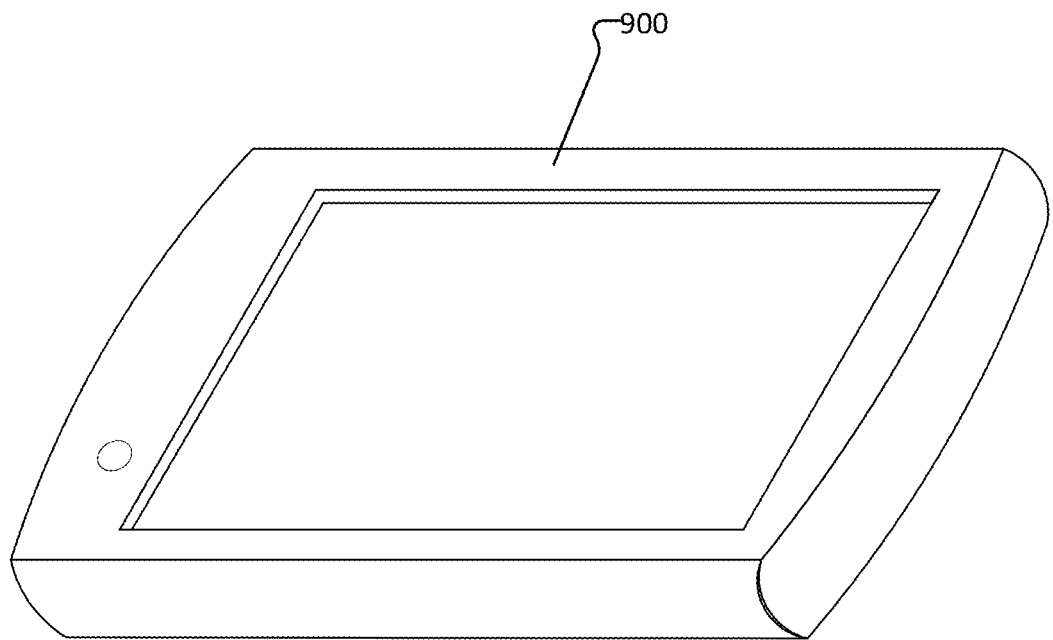
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A computer-implemented method for scheduling a new calendar event, the method comprising:
   receiving a set of conditions for the new calendar event, wherein the set of conditions includes a desired time period and a first invitee;
   retrieving a first calendar of the first invitee, wherein the first calendar comprises a first existing calendar event during a first time period that at least partially overlaps the desired time period;
   generating a first flexibility score for the first existing calendar event in the first calendar of the first invitee, wherein the first flexibility score represents a probability that the first existing calendar event will be rescheduled to an alternative time period that does not overlap the desired time period, wherein the first flexibility score is generated using at least one machine-learning model associated with factors of the first existing calendar event in the first calendar, wherein the first flexibility score is generated at least in part by:
      generating, using the at least one machine-learning model, weighted interim scores comprising a respective interim weighted score for each of the factors of the first existing calendar event, and
      aggregating the weighted interim scores to provide the first flexibility score; and
   based on the first flexibility score, controlling a visual appearance of the first existing calendar event depicted in the first calendar by rendering at least one of a color, a color shade, or a pattern, of the first existing calendar event to visually indicate a level of flexibility corresponding to the first flexibility score.

2. The computer-implemented method of claim 1, wherein the set of conditions further includes:
   a location; and
   a second invitee.

3. The computer-implemented method of claim 2, the method further comprising:
   retrieving a second calendar of the second invitee, wherein the second calendar includes a second existing calendar event, and wherein the second existing calendar event is scheduled during a second time period at least partially overlapping the desired time period;
   retrieving a second flexibility score for the second existing calendar event; and
   based on the second flexibility score, sending a second event request to the second invitee for the new calendar event during the desired time period.

4. The computer-implemented method of claim 3, wherein the first flexibility score and the second flexibility score are evaluated concurrently prior to determining the desired time period for the new calendar event.

5. The computer-implemented method of claim 1, wherein the first calendar includes a second existing calendar event scheduled at a second time period in temporal proximity to the desired time period, the method further comprising:
   retrieving a second flexibility score for the second existing calendar event, wherein the second flexibility score is higher than the first flexibility score; and
   based on a comparison of the first flexibility score and the second flexibility score, determining the desired time period for the new calendar event, wherein the desired time period at least partially overlaps the second time period of the second existing calendar event.

6. The computer-implemented method of claim 1, wherein the first flexibility score represents the probability that the first existing calendar event will be rescheduled by the first invitee.

7. The computer-implemented method of claim 6, wherein when the first flexibility score is high, the first invitee is more likely to accept an event request for the new calendar event and to reschedule the first existing calendar event.

8. The computer-implemented method of claim 1, further comprising: based on analyzing the first calendar of the first invitee, recommending a second desired time period for rescheduling the first existing calendar event.

9. The computer-implemented method of claim 8, wherein the factors used to calculate the first flexibility score include:
   a busyness factor for at least the first invitee of the first existing calendar event;
   an urgency factor of the first existing calendar event;
   an importance factor of at least the first invitee for the first existing calendar event;
   a location factor indicating a preferred location for the first existing calendar event;
   an interest factor of at least the first invitee for the first existing calendar event; or
   a time preference factor of at least the first invitee for the first existing calendar event.

10. The computer-implemented method of claim 8, wherein the first existing calendar event is associated with a second invitee, and wherein the factors used to calculate the first flexibility score include:
    a busyness factor for at least the first invitee and the second invitee of the first existing calendar event;
    an urgency factor of the first existing calendar event;
    an importance factor of at least the first invitee and the second invitee for the first existing calendar event;
    a location factor indicating a preferred location of at least the first invitee and the second invitee for the first existing calendar event;
    an interest factor of at least the first invitee and the second invitee for the first existing calendar event; or
    a time preference factor of at least the first invitee and the second invitee for the first existing calendar event.

11. The computer-implemented method of claim 1, wherein the factors comprise a facility requirement or an equipment requirement for the first existing calendar event.

12. The computer-implemented method of claim 11, wherein a weight is assigned to each of the factors by the at least one machine-learning model.

13. The computer-implemented method of claim 11, wherein the first flexibility score is calculated for the first existing calendar event by the at least one machine-learning model using background processing, and wherein the first flexibility score is stored in a database.

14. The computer-implemented method of claim 13, wherein the first flexibility score is updated in response to a change of conditions in the first calendar.

15. The computer-implemented method of claim 14, wherein the change of conditions includes:
receiving an updated event request for the first existing calendar event; or
receiving updated data influencing one or more of the factors.

16. The computer-implemented method of claim 11, wherein the at least one machine-learning model generates the weighted interim scores using a plurality of:
a time differential learning model, wherein the time differential learning model generates a first weighted interim score for the first existing calendar event based on a remaining time between the first time period and a current time;
an event density learning model, wherein the event density learning model generates a second weighted interim score for the first existing calendar event based on an event density of the first calendar, wherein the event density is a number of existing calendar events during a predefined time period;
an event importance learning model, wherein the event importance learning model generates a third weighted interim score based on a level of importance to the first existing calendar event; or
an invitee interest learning model, wherein the invitee interest learning model generates a fourth weighted interim score based on a level of interest of one or more invites of the first existing calendar event.

17. A computer system comprising:
at least one processing unit; and
at least one memory storing computer-executable instructions that, when executed by the at least one processing unit, cause the computer system to:
receive a set of conditions for a new calendar event, wherein the set of conditions includes a desired time period;
retrieve a calendar of a first invitee of the new calendar event, wherein the calendar comprises a first existing calendar event during a first time period that at least partially overlaps the desired time period;
generate a first flexibility score for the first existing calendar event in the calendar of the first invitee, wherein the first flexibility score represents a probability that the first existing calendar event will be rescheduled to an alternative time period that does not overlap the desired time period, and wherein the first flexibility score is generated using at least one machine-learning model associated with factors of the first existing calendar event in the calendar, wherein the first flexibility score is generated at least in part by:
generating, using the at least one machine-learning model, weighted interim scores comprising a respective interim weighted score for each of the factors of the first existing calendar event, and
aggregating the weighted interim scores to provide the first flexibility score; and
based on the first flexibility score, controlling a visual appearance of the first existing calendar event depicted in the calendar by rendering at least one of a color, a color shade, or a pattern, of the first existing calendar event to visually indicate a level of flexibility corresponding to the first flexibility score.

18. The computer system of claim 17, wherein the first flexibility score is calculated based on the factors, and wherein the factors include:
an urgency factor of the first existing calendar event and the new calendar event;
an importance factor of the first invitee for the first existing calendar event and the new calendar event;
a location factor indicating a preferred location for the first existing calendar event and the new calendar event;
an interest factor of at least the first invitee for the first existing calendar event and the new calendar event; or
a time preference factor of at least the first invitee for the first existing calendar event and the new calendar event.

19. The computer system of claim 17, wherein the factors comprise a facility requirement or an equipment requirement for the first existing calendar event.

20. A computer storage medium not consisting of a propagated data signal, the computer storage medium storing computer-executable instructions that, when executed by at least one processing unit, cause the at least one processing unit to:
receive a set of conditions for a new calendar event, wherein the set of conditions includes a desired time period and at least a first invitee;
retrieve a calendar of the first invitee, wherein the calendar includes a first existing calendar event and a second existing calendar event, wherein the first existing calendar event is scheduled during a first time period that at least partially overlaps the desired time period, and wherein the second existing calendar event is scheduled during a second time period that at least partially overlaps the desired time period;
generate, using one or more machine-learning models associated with factors of the first existing calendar event in the calendar, a first flexibility score for the first existing calendar event in the calendar of the first invitee, wherein the first flexibility score represents a first probability that the first existing calendar event will be rescheduled to a first alternative time period that does not overlap the desired time period, wherein generate the first flexibility score comprises:
generate, by the one or more machine-learning models, first weighted interim scores comprising a respective interim weighted score for each of factors of the first existing calendar event, and
aggregate the first weighted interim scores to provide the first flexibility score;
generate, using the one or more machine-learning models, a second flexibility score for the second existing calendar event in the calendar of the first invitee, wherein the second flexibility score represents a second probability that the second existing calendar event will be rescheduled to a second alternative time period that does not overlap the desired time period, and wherein the second flexibility score is higher than the first flexibility score, wherein the one or more machine-learning models generate second weighted interim scores for the second existing calendar event in the calendar based on factors of the second existing calendar event, and wherein the one or more machine-learning models generate the second flexibility score by aggregating the second weighted interim scores;

based on the first flexibility score and the second flexibility score, controlling a visual appearance of the first existing calendar event and the second existing calendar event depicted in the calendar by rendering at least one of a color, a color shade, or a pattern, of the first existing calendar event and the second existing calendar event, respectively, to visually indicate respective levels of flexibility corresponding to the first flexibility score and the second flexibility score.

\* \* \* \* \*